(12) United States Patent
Pieczul et al.

(10) Patent No.: US 12,388,876 B2
(45) Date of Patent: Aug. 12, 2025

(54) PROCESS SECURITY CAPABILITY REQUIREMENTS IDENTIFICATION

(71) Applicant: Oracle International Corporation, Redwood Shores, CA (US)

(72) Inventors: Olgierd Stanislaw Pieczul, Dublin (IE); Shrey Arora, Seattle, WA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 193 days.

(21) Appl. No.: 17/877,740

(22) Filed: Jul. 29, 2022

(65) Prior Publication Data
US 2024/0039963 A1    Feb. 1, 2024

(51) Int. Cl.
*H04L 9/40* (2022.01)

(52) U.S. Cl.
CPC ................. *H04L 63/205* (2013.01)

(58) Field of Classification Search
CPC .................................... H04L 63/205
USPC ............................................. 726/1
See application file for complete search history.

(56) References Cited

U.S. PATENT DOCUMENTS

| | | | | |
|---|---|---|---|---|
| 9,223,972 B1* | 12/2015 | Vincent | ............... | H04L 63/1425 |
| 9,882,909 B2* | 1/2018 | Awan | ................... | H04L 63/101 |
| 10,565,378 B1* | 2/2020 | Vincent | ................. | G06F 21/566 |
| 10,628,560 B1* | 4/2020 | Siranni | ............... | G06F 21/6281 |
| 11,989,283 B2* | 5/2024 | Zhang | ................... | G06F 21/577 |
| 2011/0126205 A1* | 5/2011 | Gaist | ..................... | G06F 21/554 |
| | | | | 718/103 |
| 2011/0167434 A1* | 7/2011 | Gaist | ....................... | G06F 9/545 |
| | | | | 719/320 |
| 2012/0011153 A1* | 1/2012 | Buchanan | ............. | G06F 21/552 |
| | | | | 707/E17.014 |
| 2014/0137184 A1* | 5/2014 | Russello | ................. | H04L 63/20 |
| | | | | 726/1 |
| 2014/0173700 A1* | 6/2014 | Awan | ..................... | H04W 12/02 |
| | | | | 726/4 |
| 2017/0054730 A1* | 2/2017 | Awan | ..................... | H04L 63/107 |
| 2018/0159701 A1* | 6/2018 | Krause | ................ | H04L 61/2514 |
| 2020/0193016 A1* | 6/2020 | Zeng | ..................... | G06F 11/301 |
| 2022/0108007 A1* | 4/2022 | Zatutschne-Marom | | ..................... |
| | | | | G06F 21/52 |
| 2022/0129541 A1* | 4/2022 | Scrivano | ................. | G06F 9/545 |
| 2022/0253524 A1* | 8/2022 | Gadient | ................ | G06F 21/566 |

OTHER PUBLICATIONS

Henry Hanping Feng; Anomaly Detection Using Call Stack Information; IEEE: Year:2003; pp. 1-14.*

* cited by examiner

*Primary Examiner* — Monjur Rahim
(74) *Attorney, Agent, or Firm* — Kilpatrick Townsend & Stockton LLP

(57) ABSTRACT

A framework for determining capabilities for execution of a system call a container and/or process within a computing system. For example, techniques for determining capabilities prerequisite for execution of a system call and determining whether the system call has been assigned the capabilities prerequisite for execution of the system call.

20 Claims, 13 Drawing Sheets

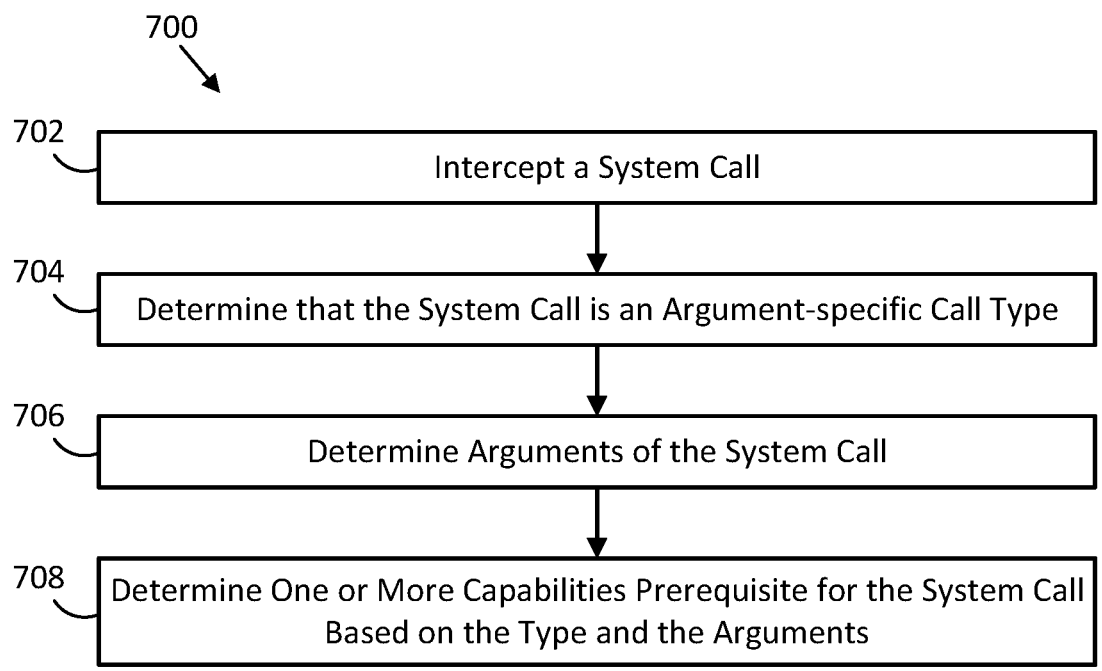

```
                700
                 ↓
702 ─→ [ Intercept a System Call ]
                 ↓
704 ─→ [ Determine that the System Call is an Argument-specific Call Type ]
                 ↓
706 ─→ [ Determine Arguments of the System Call ]
                 ↓
708 ─→ [ Determine One or More Capabilities Prerequisite for the System Call
         Based on the Type and the Arguments ]
```

FIG. 7

```
            800
             ↓
      {
802 → "syscall": "bind",
      "condition": [
             {
804 →        "argument": "sockaddr.sin_family",
806 →        "op": "EQUAL",
808 →        "val": "AF_INET"
             },
             {
810 →        "argument": "socaddr.sin_port",
812 →        "op": "LESS_THAN",
814 →        "val": 1024,
816 →        "variable": true
             }
      ],
818 → caps: ["CAP_NET_BIND_SERVICE" ]
      }
```

FIG. 8

PROCESS SECURITY CAPABILITY REQUIREMENTS IDENTIFICATION

BACKGROUND

In computing systems (including cloud computing systems), it has been common practice to have container workloads. These containers allow for applications to be packaged into a single, self-contained package. The container may run with a degree of isolation from the rest of the operating system and other containers.

Often developers of containers develop containers to run as a privileged user on the computing systems. Due to the container being a constrained environment, the container being run as a privileged user was viewed as low risk with the isolation mitigating the risk. A massive amount of containerized software have been developed that run as a privileged user and are utilized in many applications.

SUMMARY

The present disclosure relates generally to a system for determining capabilities prerequisite for a system call and/or privilege levels related to the system call. Various embodiments are described herein, including methods, systems, non-transitory computer-readable storage media storing programs, code, or instructions executable by one or more processors, and the like. These illustrative embodiments are mentioned not to limit or define the disclosure, but to provide examples to aid understanding thereof. Additional embodiments are discussed in the detailed description section, and further description is provided therein.

An aspect of the present disclosure is directed to one or more non-transitory, computer-readable media having instructions stored thereon, wherein the instructions, when executed by one or more processors, cause an analysis system to perform processing including intercepting a system call to be made by a process during execution of the process, where the system call is to be executed by a kernel of an operating system of a computer system that is to execute the process. The processing further including determining one or more capabilities prerequisite for execution of the system call and determining a set of one or more capabilities associated with the process. Further, the processing including generating a report comprising information indicative of the one or more capabilities and the set of one or more capabilities.

An aspect of the present disclosure is directed to a method, including intercepting, by an analysis system, a system call to be made by a process during execution of the process, where the system call is to be executed by a kernel of an operating system of a computer system that is to execute the process. The method further includes determining, by the analysis system, one or more capabilities prerequisite for execution of the system call and determining, by the analysis system, a set of one or more capabilities associated with the process. The method further includes generating, by the analysis system, a report comprising information indicative of the one or more capabilities and the set of one or more capabilities.

An aspect of the present disclosure is directed to an analysis system, including a memory to store a system call to be made by a process during execution of the process. The analysis system further includes a processor to intercept the system call for storage in the memory, where the system call is to be executed by a kernel of an operating system of a computer system that is to execute the process. The processor is further to determine one or more capabilities prerequisite for execution of the system call and determine a set of one or more capabilities associated with the process. The processor is further to generate a report comprising information indicative of the one or more capabilities and the set of one or more capabilities.

The foregoing, together with other features and embodiments will become more apparent upon referring to the following specification, claims, and accompanying drawings.

BRIEF DESCRIPTION OF THE DRAWINGS

Features, embodiments, and advantages of the present disclosure are better understood when the following Detailed Description is read with reference to the accompanying drawings.

FIG. 7 illustrates an example procedure for an argument-specific call type in accordance with some embodiments.

FIG. 8 illustrates an example system call mapping for an argument-specific system call type in accordance with some embodiments.

DETAILED DESCRIPTION

Figure 1:
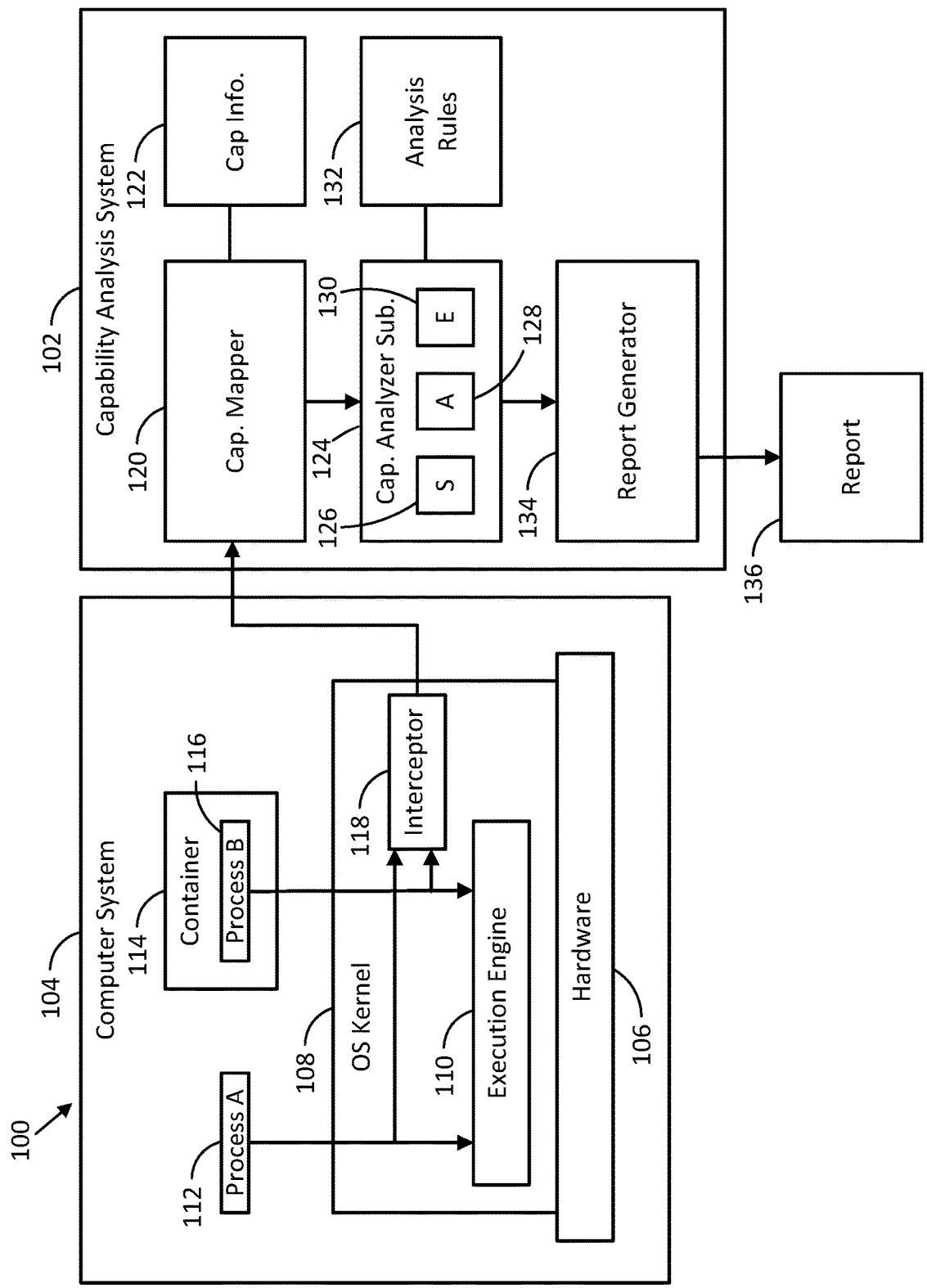
FIG. 1 illustrates an example system arrangement in accordance with some embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure describes techniques for determining capabilities prerequisite for a system call and/or privilege levels related to the system call. More particularly, an analysis system disclosed herein may be included in and/or coupled to an infrastructure as a service (IaaS) (such as the IaaS architecture illustrated in any of FIG. 11 through FIG. 14) or a computer system (such as the computer system 1500 (FIG. 15)). The analysis system may be coupled to inputs of a kernel of an operating system of the IaaS architecture or the computer system.

Processes, including processes initiated by a container, may direct system calls to the kernel of the operating system. The analysis system may intercept the system calls directed to the kernel and may analyze the system calls. In particular, the analysis system may determine a set of capabilities associated with the process that made the system call and determine one or more capabilities prerequisite to execution of the process. The set of capabilities may include capabilities that the process has been granted based on a privilege level assigned to the process.

The analysis system may determine whether the process has been granted access to the capabilities prerequisite for execution of the system call and/or whether the process has been granted additional capabilities that are not prerequisite for execution of the system call. The analysis system may identify the additional capabilities prerequisite for performance that the process has not been granted and/or capabilities that the process has been granted in addition to the capabilities prerequisite for execution of the system call. The analysis system may generate a report indicating the additional capabilities and/or capabilities in addition to the capabilities prerequisite for execution of the system call and present the report to a user. The report may assist the user in providing the additional capabilities such that the process can be executed and/or in removing granted capabilities in addition to the capabilities prerequisite for execution of the system call that may present unnecessary risks. This may be useful in changing privilege levels of processes, such as when a user determines to change the assigned privilege levels of a container from privileged user to a lower privilege level to provide lower risks. As executing containers as a privileged user has been determined to present a greater risk than previously thought, attempting to lower the privilege levels granted to containers has become common practice.

In some embodiments, the analysis system may further determine recommendations based on the assigned capabilities and the capabilities prerequisite for execution of the process. The recommendations may include changes that the user can make to provide the process the capabilities to be executed. Further, the recommendations may include changes that the user can make to reduce the capabilities prerequisite for execution of the process.

FIG. 1 illustrates an example system arrangement 100 in accordance with some embodiments. In particular, the system arrangement 100 may include a capability analysis system 102 that may analyze system calls to determine capabilities granted for the system calls and/or capabilities prerequisite for execution of the system calls.

The system arrangement 100 may include a computer system 104. The computer system 104 may include one or more of the features of the computer system 1500 (FIG. 15). Further, the computer system 104 may be part of, and/or provide services for, an IaaS architecture, such as the IaaS architecture illustrated in any of FIG. 11 through FIG. 14. A user may utilize the computer system 104 to provide one or more services for the user in some embodiments. In other embodiments, the user may a developer that is developing a process to be executed by the system.

The computer system 104 may include hardware 106. The hardware 106 may comprise computer hardware commonly included in computer systems. For example, the hardware 106 may include one or more bus subsystems (such as the bus subsystem 1502 (FIG. one or more processing units (such as the processing unit 1504 (FIG. 15)), one or more processing acceleration units (such as the processing acceleration unit 1506 (FIG. 15)), one or more I/O subsystems (such as the I/O subsystem 1508 (FIG. 15)), one or more communications subsystems (such as the communications subsystem 1524 (FIG. 15)), or some combination thereof. The hardware 106 may provide hardware components for executing processes, containers, and/or system calls.

Further, an operating system (OS) may execute on the hardware 106. For example, an OS kernel 108 may be executed on the hardware 106. The OS kernel 108 may be a computer program at a core of the OS of the computer system 104. The OS kernel 108 may include an execution engine 110. The execution engine 110 may execute system calls to provide services. The system calls may be received from processes and/or containers.

The computer system 104 may execute one or more processes and/or containers to provide services for applications being executed on the computer system 104. A first process 112 and a container 114 containing a second process 116 are illustrated within the computer system 104 in the illustrated embodiment. The first process 112 and the container 114 containing the second process 116 may comprise computer code that can be executed by the computer system 104. For example, one or more processors of the computer system 104 may execute the first process 112 and/or the container 114, where the first process 112 and/or the container 114 may include instructions that can be executed by the processors to perform one or more procedures. When executed, the first process 112 and/or the container 114 may initiate a system call to the OS kernel 108 to be executed by the execution engine 110 of the OS kernel 108.

In some embodiments, the capability analysis system 102 may be coupled to the computer system 104. For example, the capability analysis system 102 may comprise computer hardware coupled to the computer system 104, such as being coupled by a network to the computer system 104, coupled by one or more wires to the computer system 104, and/or wirelessly coupled to the computer system 104. The capability analysis system 102 may further include computer software that can be executed by the computer hardware of the capability analysis system 102 to perform one or more of the procedures described throughout this disclosure as being performed by the capability analysis system 102.

In some embodiments, the capability analysis system 102 may further be part of the computer system 104, where the capability analysis system 102 may comprise software that utilizes the hardware 106 of the computer system 104 to perform one or more procedures described as being performed by the capability analysis system 102 described throughout this disclosure. Further, the capability analysis system 102 may be a combination of computer hardware coupled to the computer system 104 and software implemented on the computer system 104.

The capability analysis system 102 may include an interceptor 118. The interceptor 118 may be implemented within the OS kernel 108 of the computer system 104. For example, the interceptor 118 may comprise computer software implemented within the OS kernel 108. The interceptor 118 may be coupled between the execution engine 110 of the OS kernel 108 and the programs that execute the first process 112 and/or the container 114. The interceptor 118 may intercept system calls initiated by the first process 112 and/or the second process 116 within the container 114. The interceptor 118 may be an in-line process that intercepts the system calls at runtime. The interceptor 118 may forward the system calls to one or more other components of the capability analysis system 102. In some embodiments, the interceptor 118 may further prevent the system calls from arriving at the execution engine 110 and/or delaying execution of the system calls by the execution engine 110 until the capability analysis system 102 determines whether the system calls can be properly performed by the execution engine 110.

The capability analysis system 102 may include a capability mapper 120. The capability mapper 120 may receive the system calls provided by the interceptor 118. The capability mapper 120 may retrieve capability information 122 based on the reception of the system calls. The capability information 122 may include information for determining types of each of the system calls received by the capability mapper 120. In some embodiments, the capability information 122 may be stored in a memory of the capability analysis system 102. In other embodiments, the capability mapper 120 may retrieve the capability information 122 from a network (such as the Internet), a server, another computing system, or some combination thereof.

The capability mapper 120 may determine the type of a system call received based on the capability information and the system call. For example, the capability mapper 120 may determine whether the system call is a simple call type, an argument-specific call type, or an environment-specific capability type. The capability mapper 120 may compare the computer code of the system call to the capability information from the capability information 122 to determine whether the system call is the simple call type, the argument-specific call type, or the environment-specific call type. The capability information 122 may include a group of system calls corresponding to the simple call type, a group of system calls corresponding to the argument-specific call type, and a group of system calls corresponding to the environment-specific call type. The capability mapper 120 may determine whether the system call is included in the group of system calls corresponding to the simple call type, the group of system calls corresponding to the argument-specific call type, or the group of system calls corresponding to the environment-specific call type to determine whether the system call is a simple call type, an argument-specific call type, or an environment-specific call type. For example, the capability mapper 120 may determine that the system call is a reboot system call (which may be indicated within the code of the system call) and determine that reboot system call is within the group of system calls corresponding to the simple call type. The capability mapper 120 may determine that the system call is a simple call type based on the reboot system call being with the group of system calls corresponding to the simple call type. The capability mapper 120 may generate an indication of the system call type and provide the indication with the system call to a capability analyzer subsystem 124 of the capability analysis system 102.

In some embodiments, the capability mapper 120 may further determine capabilities assigned to the system call. For example, the capability mapper 120 may determine a privilege level assigned to the system call and determine capabilities assigned to the system call based on the privilege level. Each privilege level may have corresponding capabilities, where the system call assigned a privilege level may have the capabilities assigned to the privilege level. In these embodiments, the capability mapper 120 may generate an indication of the capabilities assigned to the system call and provide the indication to the capability analysis system 102. In some embodiments, the indication of the capabilities assigned to the system call may be provided with the indication of the system call type and/or the system call to the capability analysis system 102.

The capability analysis system 102 may include a capability analyzer subsystem 124. The capability analyzer subsystem 124 may receive the system call along with the indication of the system call type. In some embodiments, the capability analyzer subsystem 124 may further receive the indication of the capabilities assigned to the system call. In other embodiments, the capability analyzer subsystem 124 may determine the capabilities assigned to the system call. For example, the capability analyzer subsystem 124 may determine the capabilities assigned to the system call based on the privilege level assigned to the system call.

The capability analyzer subsystem 124 may determine a type of analysis to perform with the system call based on the indication of the system call type. For example, the capability analyzer subsystem 124 may include a simple system call analyzer 126, an argument-specific system call analyzer 128, an environment-specific system call analyzer 130, or some combination thereof. The capability analyzer subsystem 124 may utilize the analyzer corresponding to the system call type to determine capability information for the system call. In particular, the capability analyzer subsystem 124 may utilize the simple system call analyzer 126 to analyze system calls of the simple system call type, utilize the argument-specific system call analyzer 128 to analyze system calls of the argument-specific system call type, and utilize the environment-specific system call analyzer 130 to analyze system calls of the environment-specific system call type.

The capability analyzer subsystem 124 may retrieve analysis rules 132 to perform analysis of the system calls. The capability analyzer subsystem 124 may retrieve the analysis rules 132 based on the reception of the system call and/or the indication of the system call type from the capability mapper 120. In some embodiments, the analysis rules 132 retrieved by the capability analyzer subsystem 124 may be limited to analysis rules directed to the determined type of the system call and/or the particular system call itself. The analysis rules 132 may include information for determining which capabilities are prerequisite for execution of the system call. For example, the information may include considerations (such as the particular system call, the arguments of the system call, and/or the parameters of the system call) to be taken into account for determining the capabilities prerequisite for execution of the system call.

In the instance where a system call has been determined to be a simple system call, the capability analyzer subsystem 124 may utilize the simple system call analyzer 126 to determine the capabilities for the system call. The simple system call analyzer 126 may utilize the particular system call to determine what capabilities are prerequisite for execution of the system call. The analysis rules 132 retrieved by the capability analyzer subsystem 124 may comprise capabilities corresponding to the particular system call in the instance where the system call is a simple system call type. The capabilities prerequisite for execution of the system call may be dependent on the particular system call, where the analysis rules 132 may indicate the capabilities based on the particular system call for the simple system call type. For example, the capabilities prerequisite for a reboot system call may be determined based solely on the system call being the reboot system call, where the analysis rules 132 may indicate the capabilities prerequisite for a reboot system call.

In the instance where a system call has been determined to be an argument-specific system call, the capability analyzer subsystem 124 may utilize the argument-specific system call analyzer 128 to determine the capabilities for the system call. The argument-specific system call analyzer 128 may utilize the particular system call and one or more arguments of the system call to determine what capabilities are prerequisite for execution of the system call. The analysis rules 132 retrieved by the capability analyzer subsystem 124 may comprise capabilities corresponding to the particular system call as well as which capabilities are prerequisite for execution of system call based on the one or more arguments of the system call. For example, a bind system call may take an argument corresponding to a network socket. Depending on the value assigned to the argument, the capabilities prerequisite for execution of the system call differ. Accordingly, the argument-specific system call analyzer 128 may retrieve analysis rules 132 corresponding to the bind system call. The analysis rules 132 may indicate different capabilities prerequisite for execution of the system call for different values assigned to the argument. The argument-specific system call analyzer 128 may compare the value assigned to the argument within the system call to the defined values within the analysis rules 132 to determine which capabilities are prerequisite for execution of the system call being analyzed.

In the instance where a system call has been determined to be an environment-specific system call, the capability analyzer subsystem 124 may utilize the environment-specific system call analyzer 130 to determine the capabilities for the system call. The environment-specific system call analyzer 130 may utilize the particular system call, one or more arguments of the system call, one or more parameters of the system call, and/or the particular environment in which the system call is to be executed to determine the capabilities prerequisite for execution of the system call. Environments, as utilized herein, may be computing systems (including a server, a computer, and/or a computing device) and/or programs (such as an operating system) operating on computing systems The parameters of the system call may include other characteristics associated with the system call that could be utilized for determining capabilities prerequisite to performance of the system call, such as a user identifier (UID), a global identifier (GID), a file to be accessed by the system call, and/or other information associated with the system call. The environment-specific system call analyzer 130 may further take into account settings of the environment, such as permissions to access a file stored in the environment, on which the system call is to be executed to determine the capabilities prerequisite for execution of the system call. In the illustrated example, the environment-specific system call analyzer 130 may retrieve information about the computer system 104. Software, such as the interceptor 118, may be executed on the computer system 104 to provide the environment-specific system call analyzer 130 with the information about the computer system 104.

The environment-specific system call analyzer 130 may setup a test environment having the settings and the characteristics of the environment on which the system call is to be executed. The environment-specific system call analyzer 130 may attempt to execute the system call in the test environment to determine whether the system call can be successfully executed. If the environment-specific system call analyzer 130 determines that the system call can be successfully executed based on the execution in the test environment, the environment-specific system call analyzer 130 may determine that no additional capabilities are prerequisite for execution of the system call. If the environment-specific system call analyzer 130 determines that the system call fails to be executed properly within the test environment, the environment-specific system call analyzer 130 may determine that additional capabilities, as compared to the current capabilities assigned to the system call, are prerequisite for execution of the system call.

In some embodiments, the environment-specific system call analyzer 130 may further determine the capabilities prerequisite for the system call based on the execution of the system call in the test environment. For example, the environment-specific system call analyzer 130 may monitor for the capabilities prerequisite for execution of the system call while the system call is being executed in the test environment. Accordingly, the environment-specific system call analyzer 130 may determine the capabilities prerequisite for execution of the system call in the instance where the system call is determined to be an environment-specific system call.

In some embodiments where the capabilities analyzer subsystem 124 determines that the process and/or the container initiating the system call has not been granted all of the capabilities for proper execution of the system call, the capabilities analyzer subsystem 124 may determine the additional capabilities to be granted for proper execution of the system call. For example, the capabilities analyzer subsystem 124 may determine that the capabilities prerequisite for execution of the system call includes capabilities that have not been granted to the process and/or the container. The capabilities analyzer subsystem 124 may determine one or more capabilities prerequisite for execution of the system call that have not been granted to the process and/or container that initiated the system call. For example, the capabilities analyzer subsystem 124 may compare the capabilities assigned to the system call to the capabilities prerequisite for execution of the system call to determine any capabilities prerequisite for execution that have not been assigned to the system call.

The capability analysis system 102 may include a report generator 134. The report generator 134 may generate a report 136 that can be output by the capability analysis system 102. The report 136 output by the capability analysis system 102 may be displayed on the computer system 104, may be displayed on another device, may be produced on a physical element (such as being printed by a printer), or some combination thereof. The report generator 134 may receive capability information from the capability analyzer subsystem 124. For example, the report generator 134 may receive an indication of whether the system call has been granted the capabilities to be executed properly by the computer system 104. The report 136 generated by the report generator 134 may include an indication of whether the system call has been granted the capabilities to be executed properly by the computer system 104. Accordingly, a user of the capability analysis system 102 may be able to determine whether the system call can be properly executed with the current capabilities granted to the process and/or the container based on the report 136.

In some embodiments, the report generator 134 may receive an indication of the capabilities prerequisite to execution of the system call that have not been granted to the process and/or the container that initiated the system call.

The report 136 generated by the report generator 134 may include an indication of the capabilities prerequisite to execution of the system call that have not been granted to the process and/or the container that initiated the system call. Accordingly, a user of the capability analysis system 102 may be able to determine which additional capabilities are to be granted to the process and/or the container that initiated the system call for proper execution of the system call based on the report 136. The user may then be able to make changes such that the process and/or the container is granted the capabilities to have the system call properly executed.

While the capability analysis system 102 is shown with particular elements in the illustrated embodiment, it should be understood that the capability analysis system 102 may omit some of the elements or have additional elements in other embodiments. In particular, the capability analysis system 102 may include less elements than described in the illustrated embodiments, where the elements included in the capability analysis system 102 may still provide the functionality described in relation to the capability analysis system 102.

Figure 2:
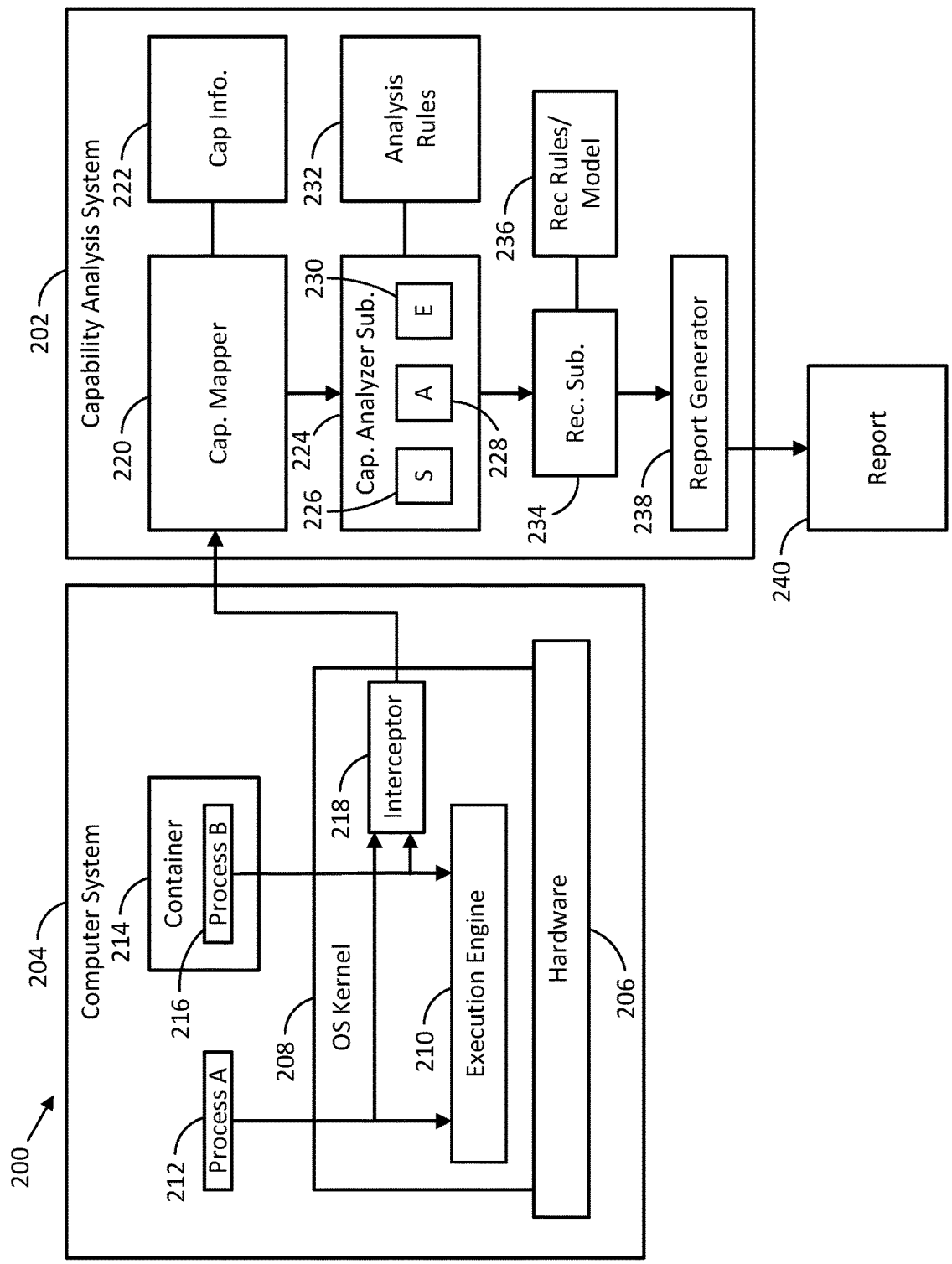
FIG. 2 illustrates another example system arrangement in accordance with some embodiments.

FIG. 2 illustrates another example system arrangement 200 in accordance with some embodiments. The system arrangement 200 may include a capability analysis system 202 that may provide one or more recommendations in addition to determining capabilities granted for system calls and/or capabilities prerequisite for execution of the system calls.

The system arrangement 200 may include a computer system 204. The computer system 204 may include one or more of the features of the computer system 104 (FIG. 1). For example, the computer system 204 may include hardware 206 that can execute an OS having a OS kernel 208 with an execution engine 210. The hardware 206 may include one or more of the features of the hardware 106 (FIG. 1), the OS kernel 208 may include one or more of the features of the OS kernel 108 (FIG. 1), and the execution engine 210 (FIG. 2) may include one or more of the features of the execution engine 110 (FIG. 1). The computer system 204 may execute one or more processes and/or containers, where a first process 212 and a container 214 having a second process 216 are shown in the illustrated embodiment. The first process 212 may include one or more of the features of the first process 112 (FIG. 1) and the container 214 may include one or more of the features of the container 114 (FIG. 1).

The system arrangement 200 may include the capability analysis system 202. The capability analysis system 202 may be coupled to the computer system 204. For example, the capability analysis system 202 may comprise computer hardware coupled to the computer system 204, such as being coupled by a network to the computer system 204, coupled by one or more wires to the computer system 204, and/or wirelessly coupled to the computer system 204. The capability analysis system 202 may further include computer software that can be executed by the computer hardware of the capability analysis system 202 to perform one or more of the procedures described throughout this disclosure as being performed by the capability analysis system 202.

In some embodiments, the capability analysis system 202 may further be part of the computer system 204, where the capability analysis system 202 may comprise software that utilizes the hardware 206 of the computer system 204 to perform one or more procedures described as being performed by the capability analysis system 202 described throughout this disclosure. Further, the capability analysis system 202 may be a combination of computer hardware coupled to the computer system 204 and software implemented on the computer system 204.

The capability analysis system 202 may include an interceptor 218. The interceptor 218 may include one or more of the features of the interceptor 118 (FIG. 1). The interceptor 218 may intercept calls initiated by the first process 212 and/or second process 216 within the container 214. The interceptor 218 may be an in-line process that intercepts the system calls at runtime. The interceptor 218 may forward the system calls to one or more other components of the capability analysis system 202.

The capability analysis system 202 may include a capability mapper 220. The capability mapper 220 may include one or more of the features of the capability mapper 120 (FIG. 1). The capability mapper 220 may receive system calls provided by the interceptor 218 and may determine whether the system calls are a simple call type, an argument-specific call type, or an environment-specific call type. For example, the capability mapper 220 may retrieve capability information 222, where the capability information 222 may include one or more of the features of the capability information 122 (FIG. 1). The capability mapper 220 may determine whether the system calls are a simple call type, an argument-specific call type, or an environment-specific call type in accordance with the approaches described in relation to the capability mapper 120.

The capability analysis system 202 may include a capability analyzer subsystem 224. The capability analyzer subsystem 224 may include one or more of the features of the capability analyzer subsystem 124 (FIG. 1). For example, the capability analyzer subsystem 224 may include a simple system call analyzer 226, an argument-specific system call analyzer 228, and an environment-specific system call analyzer 230. The simple system call analyzer 226 may include one or more features of the simple system call analyzer 126 (FIG. 1), the argument-specific system call analyzer 228 may include one or more of the features of the argument-specific system call analyzer 128 (FIG. 1), and the environment-specific system call analyzer 230. The capability analyzer subsystem 224 may retrieve analysis rules 232 to perform analysis of the system calls, where the analysis rules 232 may include one or more of the features of the analysis rules 132 (FIG. 1). The capability analysis system 202 may utilize the simple system call analyzer 226, the argument-specific system call analyzer 228, or the environment-specific system call analyzer 230 to determine the capabilities prerequisite for execution of the system call and/or the capabilities granted to the processes and/or the containers in accordance with the approaches described in relation to the capability analyzer subsystem 124. Further, the capability analyzer subsystem 224 may determine the differences between the capabilities prerequisite for execution of the system call and the capabilities granted to the processes and/or the containers in accordance with the approaches described in relation to the capability analyzer subsystem 124.

The capability analysis system 202 may include a recommendation subsystem 234. The recommendation subsystem 234 may generate recommendations for changes that can be suggested based on recommendation rules and/or recommendation model 236. The recommendation rules and/or recommendation model 236 may be predefined and may indicate which recommendations may be provided by the recommendation subsystem 234. For example, the recommendation rules and/or recommendation model 236 may indicate whether recommendations related to privilege levels to be assigned to the processes and/or containers are to be presented, whether recommendations related to environment settings are to be presented, whether recommendations indicating recommended reduced privilege levels are to be presented, whether recommendations are to be presented even when the processes and/or containers can be properly executed, or some combination thereof. In some embodiments, the recommendation subsystem 234 may be configured to apply one or more of the recommendation rules and/or one or more of the recommendation models of the recommendation rules and/or recommendation model 236 rather than just recommending the changes.

The recommendation subsystem 234 may generate recommendations based on the capabilities assigned to the process and/or container, the privilege level assigned to the process and/or container, the capabilities prerequisite for execution of the process, the privilege levels available for the computer system 204, or some combination thereof. For example, the recommendation subsystem 234 may determine the capabilities assigned to the process and/or the container. In some embodiments, the recommendation subsystem 234 may determine the capabilities by determining the privilege level assigned to the process and/or container and determining the capabilities associated with the privilege level.

The recommendation subsystem 234 may compare the capabilities assigned to the process and/or the container to the capabilities prerequisite for execution of the process. If the recommendation subsystem 234 determines that the capabilities assigned to the process and/or container include the capabilities prerequisite for execution of the process, the recommendation subsystem 234 may determine that recommendations are not to be made for changing the privilege level assigned to the process and/or the container. If the recommendation subsystem 234 determines that the capabilities assigned to the process and/or container does not include one or more of the capabilities prerequisite for execution of the process, the recommendation subsystem 234 may determine that a recommendation is to be made. Based on the determination that a recommendation is to be made, the recommendation subsystem 234 may determine one or more privilege levels available for the computer system 204 that have the capabilities prerequisite for execution of the process. The recommendation subsystem 234 may determine that one or more of the privilege levels that have the capabilities prerequisite for execution of the process are to be recommended to a user. In some embodiments, the recommendation subsystem 234 may determine the privilege level to be recommended is the privilege available for the computer system 204 that includes the capabilities prerequisite for execution of the process with the least additional capabilities.

In some embodiments, the recommendation subsystem 234 may determine whether a recommendation is to be made when the process and/or container has been assigned capabilities in addition to the capabilities prerequisite for execution of the process. For example, if the recommendation subsystem 234 determines that the process and/or container is assigned capabilities in addition to the capabilities prerequisite for execution of the process, the recommendation subsystem 234 may determine which of the privilege levels available for the computer system 204 have the capabilities prerequisite for execution of the process without additional capabilities. From the privilege levels that have the capabilities prerequisite for execution of the process, the recommendation subsystem 234 may determine whether any of the privilege levels have less additional capabilities than the privilege level assigned to the process and/or container, have additional capabilities that present less risk than the privilege level assigned to the process and/or container, or some combination thereof. The recommendation subsystem 234 may determine one or more privilege levels to recommend that are determined to have less additional capabilities, have additional capabilities that present less risk, or some combination thereof.

In embodiments where the recommendation rules and/or recommendation model 236 indicate that one or more of the recommendations are to be implemented, the recommendation subsystem 234 may cause the computer system 204 to implement the one or more recommendations. For example, the recommendation subsystem 234 may determine that a privilege level assigned to the process and/or container is recommended to be changed to another privilege level. The recommendation subsystem 234 may cause the computer system 204 to change the privilege level assigned to the process and/or container to the other privilege level.

The capability analysis system 202 may include a report generator 238. The report generator 238 may include one or more of the features of the report generator 134 (FIG. 1). The report generator 238 may generate a report 240. The report 240 may include one or more of the features of the report 136 (FIG. 1). For example, the report generator 238 may generate the report 240 that may include an indication of whether the system call has been granted the capabilities to be executed properly by the computer system 204, an indication of the capabilities prerequisite for execution of the system call that have not been granted to the process and/or the container that initiated the system call, or some combination thereof.

The report 240 generated by the report generator 238 may further include one or more recommendations. For example, the recommendation subsystem 234 may provide an indication of one or more recommendations determined to be made to the report generator 238. The report generator 238 may identify the indication of the one or more recommendations and may include the one or more recommendations within the report 240. For example, the recommendation subsystem 234 may have determined that the privilege level assigned to the process and/or container making the system call is recommended to be changed from a first privilege level currently assigned to the process and/or container to a second privilege level. The recommendation subsystem 234 may provide an indication to the report generator 238 that a recommendation is to be presented that indicates that the privilege level assigned to the process and/or container could be changed to the second privilege level. The report generator 238 may include the recommendation that the privilege level could be changed to the second privilege level in the report 240.

In some embodiments where the report 240 includes one or more recommendations, the report 240 may further one or more graphical user interface (GUI) elements (such as a button) that can cause one or more of the recommendations to be implemented. For example, one or more of the recommendations presented in the report may have corresponding GUI elements. When a user selects a GUI element (such as by clicking on the GUI element), the computer system 204 may implement the corresponding recommendation, such as switching a privilege level assigned to the process and/or container in response to the selection of the corresponding GUI element.

The report 240 may be output by the capability analysis system 202. The report 240 output by the capability analysis system 202 may be displayed on the computer system 204, may be displayed on another device, may be produced on a physical element (such as being printed by a printer), or some combination thereof. In instances where the report 240 is displayed on the computer system 204 or other device, one or more GUI elements from the report 240 may be displayed on the computer system 204 or the other device for selection to implement the corresponding recommendations.

While the capability analysis system 202 is shown with particular elements in the illustrated embodiment, it should be understood that the capability analysis system 202 may omit some of the elements or have additional elements in other embodiments. In particular, the capability analysis system 202 may include less elements than described in the illustrated embodiments, where the elements included in the capability analysis system 202 may still provide the functionality described in relation to the capability analysis system 202.

Figure 3:
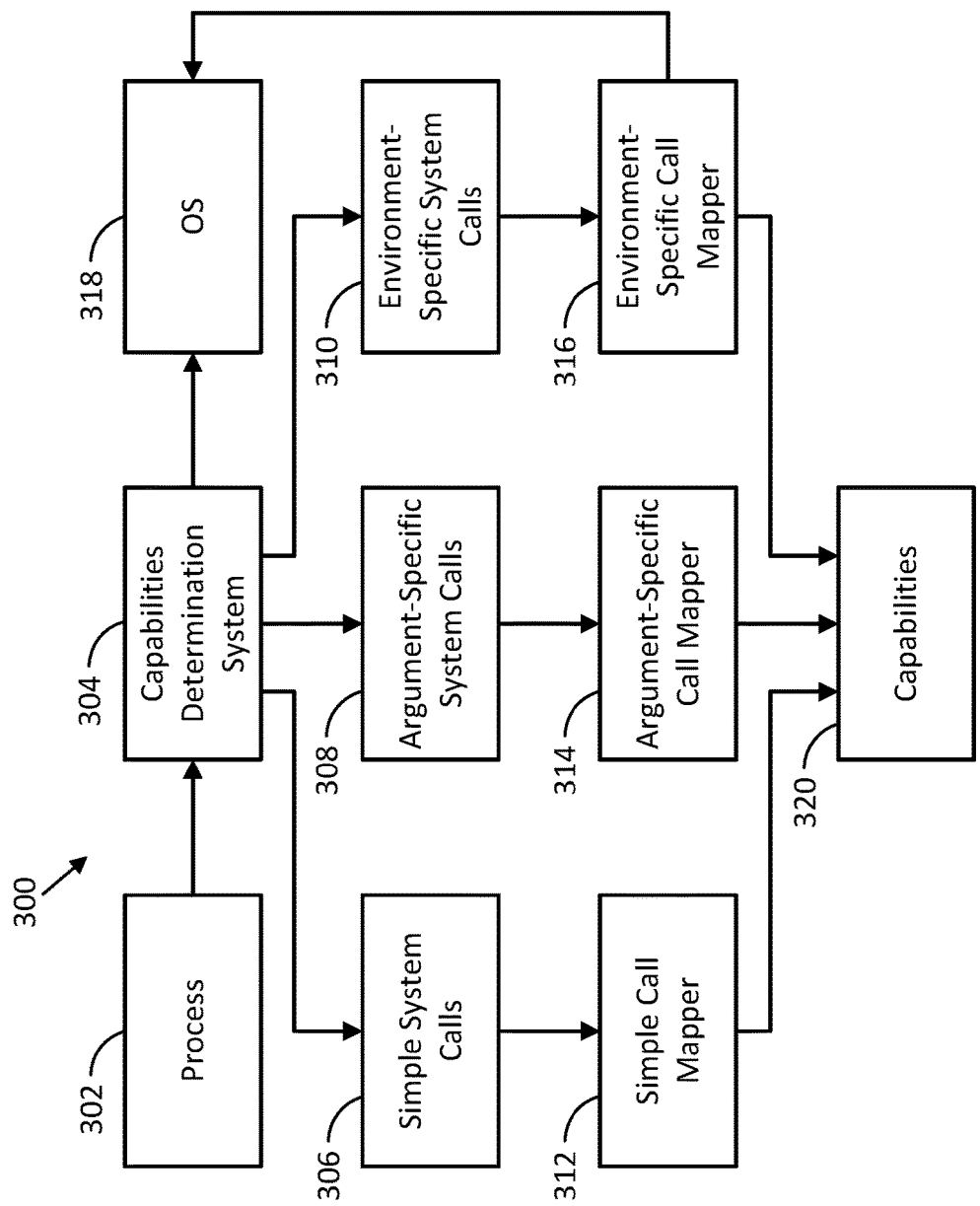
FIG. 3 illustrates a flow diagram of example system call analysis in accordance with some embodiments.

FIG. 3 illustrates a flow diagram 300 of example system call analysis in accordance with some embodiments. For example, the system call analysis may be performed on a system call to determine capabilities for the system call. The system call analysis may be performed by a computer system (such as the computer system 104 (FIG. 1) and/or the computer system 204 (FIG. 2)), a capability analysis system (such as the capability analysis system 102 (FIG. 1) and/or the capability analysis system 202 (FIG. 2), or some combination thereof.

The flow diagram 300 may include a process 302. The process 302 may include one or more of the features of the first process 112 (FIG. 1), the second process 116 (FIG. 1), the first process 212 (FIG. 2), and/or the second process 216 (FIG. 2). The process 302 may make a system call.

The flow diagram 300 may include a capabilities determination system 304. The capabilities determination system 304 may include one or more of the features of an interceptor (such as the interceptor 118 (FIG. 1) and/or the interceptor 218 (FIG. 2)), a capability mapper (such as the capability mapper 120 (FIG. 1) and/or the capability mapper 220 (FIG. 2)), a capability analyzer subsystem (such as the capability analyzer subsystem 124 (FIG. 1) and/or the capability analyzer subsystem 224 (FIG. 2)), or some combination thereof. The capabilities determination system 304 may receive the system call made by the process 302. For example, the capabilities determination system 304 may intercept the system call made by the process 302, where the process 302 may transmitted the system call to a computer system when the capabilities determination system 304 intercepts the system call.

The capabilities determination system 304 may determine the system call type of the system call that was intercepted. The capabilities determination system 304 may direct the system call for analysis based on the determined system call type. For example, the capabilities determination system 304 may determine whether the system call is a simple system call type, an argument-specific system call type, or an environment-specific system call type. The capabilities determination system 304 may determine the system call type based on capability information (such as the capability information 122 (FIG. 1) and/or the capability information 222 (FIG. 2)) related to system call types, computer code of the system call, or some combination thereof.

The capabilities determination system 304 may direct the system call to simple system calls 306, argument-specific system calls 308, or environment-specific system calls 310 based on the determined type of system calls. For example, the capabilities determination system 304 may direct system calls determined to be the simple system call type to simple system calls 306. The capabilities determination system 304 may direct system calls determined to be the argument-specific system call type to argument-specific system calls 308. The capabilities determination system 304 may direct system calls determined to be the environment-specific system call type to the environment-specific system calls 310.

The simple system calls 306 may be directed to a simple call mapper 312. The simple call mapper 312 may receive the system call and may map the system call to capabilities prerequisite for execution of the system call. The simple call mapper 312 may determine capabilities for the system call based on the approaches for determining capabilities for a simple system call type described throughout this disclosure. For example, the simple call mapper 312 may retrieve indications of capabilities corresponding to particular system calls, such capabilities provided within the analysis rules 132 (FIG. 1). The simple call mapper 312 may determine the capabilities for the particular system call provided by the capabilities determination system 304 from the indication of the capabilities.

The argument-specific system calls 308 may be directed to an argument-specific call mapper 314. The argument-specific call mapper 314 may receive the system call and may map the system call to capabilities prerequisite for execution of the system call. The argument-specific system call mapper 314 may determine capabilities for the system call based on the approaches for determining capabilities for an argument-specific system call type described throughout this disclosure. For example, the argument-specific call mapper 314 may retrieve indications of capabilities corresponding to particular system calls as well as which capabilities are prerequisite for execution of the system call based on one or more arguments of the system call. The argument-specific call mapper 314 may determine capabilities for the particular system call provided by the capabilities determination system 304 based on the particular system call and the values of the one or more arguments of the system call.

The environment-specific system calls 310 may be directed to an environment-specific call mapper 316. The environment-specific call mapper 316 may receive the system call and may map the system call to capabilities prerequisite for execution of the system call. The flow diagram 300 may include an OS 318, where the OS 318 is the OS which is to execute the system call made by the process 302. The environment-specific call mapper 316 may provide the system call to the OS 318 to determine whether the system call has been assigned the capabilities prerequisite for execution of the system call. In particular, the environment-specific call mapper 316 may cause the OS 318 to attempt to execute the system call. The environment-specific call mapper 316 may monitor the OS 318 to determine whether the system call is properly executed and may determine whether the process 302 has been assigned the capabilities prerequisite for execution of the system call based on whether the system call is properly executed. In some embodiments, the environment-specific call mapper 316 may cause a test environment (such as a sandbox environment) to be established on the OS 318, where the environment-specific call mapper 316 may cause the system call to be executed in the test environment. In some embodiments, the environment-specific call mapper 316 may further determine the capabilities prerequisite for execution of the system call based on the execution of the system call on the OS 318.

The mappers may output capabilities 320 that were determined for the system call. For example, the simple call mapper 312, the argument-specific call mapper 314, or the environment-specific call mapper 316 may output the capabilities determined to be prerequisite for execution of the system call, where the capabilities 320 may be the capabilities determined to be prerequisite for execution of the system call.

The capabilities determination system 304 may provide the system call to OS 318 for execution. For example, the capabilities determination system 304 may provide the system call intercepted from the process 302 to the OS 318. In some embodiments, the capabilities determination system 304 may delay or withhold the delivery of the system call to the OS 318 until the capabilities 320 have been output and/or it has been determined that the system call may be performed properly with the capabilities assigned to the process 302. In other embodiments, the capabilities determination system 304 may provide the system call to the OS 318 or a bypass may exist where the process 302 causes the system call to be provided to both the capabilities determination system 304 and the OS 318 at the same time, where the capabilities determination system 304 may provide the system call to the simple system calls 306, the argument-specific system calls 308, or the environment-specific system calls as the system call is being provided to the OS 318 and/or being executed by the OS 318.

Figure 4:
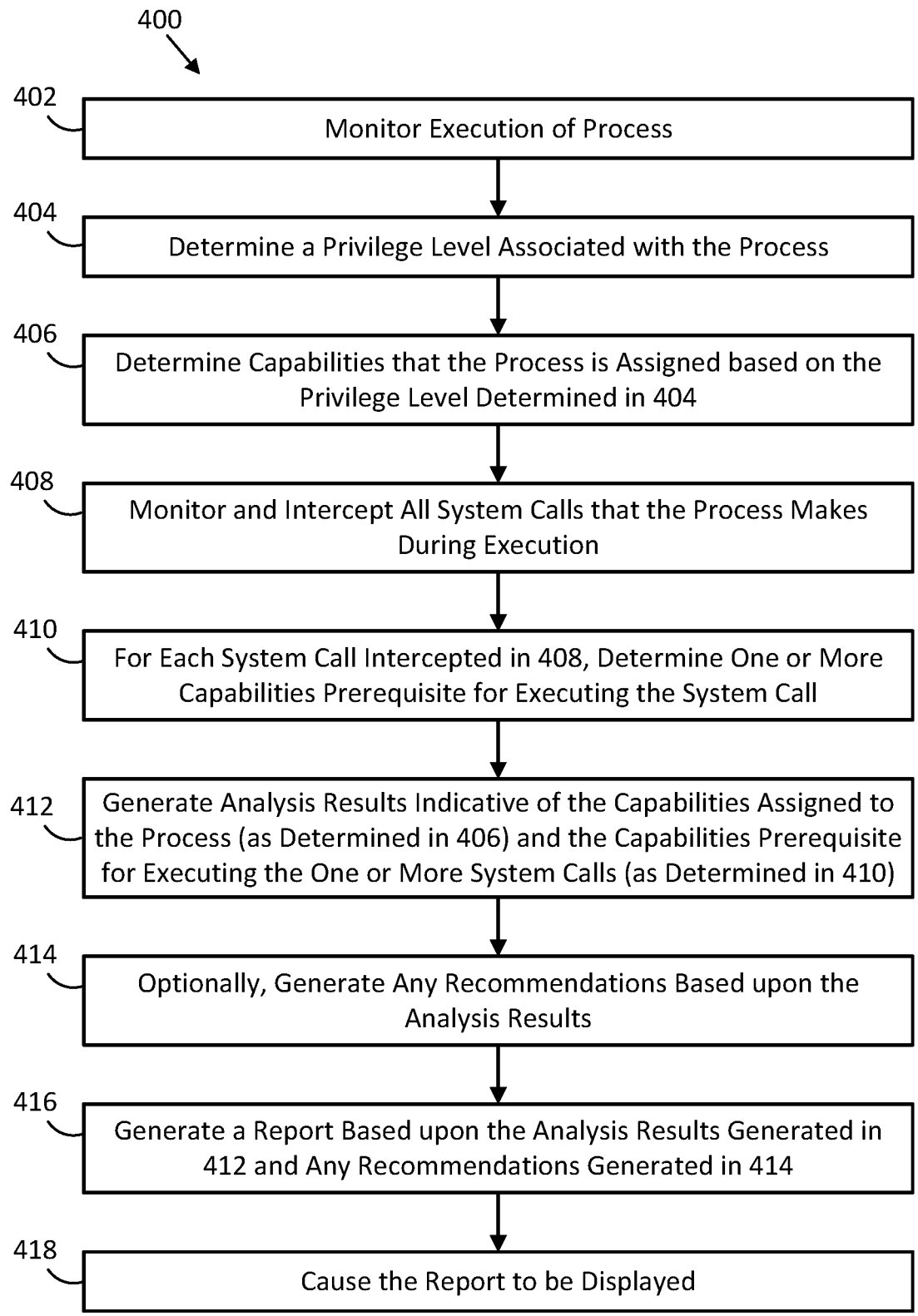
FIG. 4 illustrates an example procedure for generating a report for a process in accordance with some embodiments.

FIG. 4 illustrates an example procedure 400 for generating a report for a process in accordance with some embodiments. In particular, the process may include one or more of the features of the first process 112 (FIG. 1), the second process 116 (FIG. 1), the first process 212 (FIG. 2), the second process 216 (FIG. 2), and/or the process 302 (FIG. 3). The procedure 400 may result in the generation of a report (such as the report 136 (FIG. 1) and/or the report 240 (FIG. 2)) for the process. The procedure 400 may be performed by a capability analysis system (such as the capability analysis system 102 (FIG. 1) and/or the capability analysis system 202 (FIG. 2)), a capabilities determination system (such as the capabilities determination system 304 (FIG. 3)), a call mapper (such as the simple call mapper 312 (FIG. 3), the argument-specific call mapper 314 (FIG. 3), and/or the environment-specific call mapper 316 (FIG. 3)), or some combination thereof. For brevity, the procedure 400 is described as being performed by a capability analysis system, although it should be understood that the procedure 400 may be performed by a capability analysis system, a capabilities determination system, a call mapper, or some combination thereof in other embodiments.

In 402, the capability analysis system may monitor execution of a process. For example, the capability analysis system may be coupled to a computer system (such as the computer system 104 (FIG. 1) and/or the computer system 204 (FIG. 2)) and/or an OS (such as the OS 318 (FIG. 3)) that may execute the process. The capability analysis system may monitor for execution of the process by the computer system and/or the OS.

In 404, the capability analysis system may determine a privilege level associated with the process. For example, the computer system and/or the OS may assign or have a privilege level assigned to the process. In some embodiments, the capability analysis system may retrieve the privilege level associated with the process from the computer system and/or the OS. In some embodiments, the capability analysis system may receive an indication of the privilege level associated with the process from a system call made by the process.

In 406, the capability analysis system may determine capabilities that the process is assigned based on the privilege level determined in 404. For example, each of the privilege levels may have one or more corresponding capabilities, where a process associated with a privilege level is assigned the one or more corresponding capabilities to the privilege level. The computer system and/or the OS may maintain a mapping of each of the privilege levels to the corresponding capabilities for the privilege levels. The capability analysis system may query the computer system and/or the OS for the capabilities corresponding to the privilege determined in 404. Accordingly, the capability analysis system may determine the capabilities assigned to the process based on the privilege level being associated with the process and the capabilities corresponding to the privilege level.

In 408, the capability analysis system may monitor and intercept all system calls that the process makes during execution. For example, the process may make one or more system calls when executed by the computer system and/or the OS. The capability analysis system may monitor for these one or more system calls and may intercept the one or more system calls when made. In some embodiments, making the system calls may include transmitting the system calls to an execution engine (such as the execution engine 110 (FIG. 1) and/or the execution engine 210 (FIG. 2)), where the capability analysis system may intercept the system calls on transmission to the execution engine.

In 410, the capability analysis system may, for each system call intercepted in 408, determine one or more capabilities prerequisite for executing the system call. For example, the capability analysis system may determine the capabilities prerequisite for executing each of the system calls intercepted in 408. The capability analysis system may implement one or more of the approaches described herein for determining the capabilities prerequisite for executing each of the system calls. For example, the capability analysis system may determine a system call type for each of the system calls intercepted in 408. The capability analysis system may perform the corresponding analysis to determine the capabilities prerequisite for executing the system based on the system call type of each of the system calls. In particular, the capability analysis system may apply the analysis corresponding to a simple system call type, an argument-specific system call type, or the environment-specific system call type for each of the system calls based on the determination of the type of each of the system calls. The analysis may produce the capabilities for executing each of the system calls.

In 412, the capability analysis system may generate analysis results indicative of the capabilities assigned to the process (as determined in 406) and the capabilities prerequisite for executing the one or more system calls (as determined in 410). For example, the analysis results may indicate whether the capabilities assigned to the process include the capabilities prerequisite for executing the one or more system calls. If the capabilities assigned to the process do not include the capabilities prerequisite, the analysis results may indicate that process is not assigned adequate capabilities and/or the privilege level assigned to the process is not adequate for execution of the one or more system calls. In some embodiments, the analysis results may further indicate the capabilities prerequisite for executing the one or more system calls and/or the capabilities assigned to the process.

In 414, the capability analysis system may, optionally, generate any recommendations based upon the analysis results. For example, the capability analysis system may determine one or more privilege levels and/or one or more capabilities to be recommended based on the analysis results. The recommendations generated may include one or more of the recommendations described in relation to the recommendation subsystem 234 (FIG. 2). In instances where the process has not been assigned one or more of the capabilities prerequisite for executing the one or more processes, the capability analysis system may generate a recommendation that indicates one or more privilege levels that can be assigned to the process to provide the capabilities prerequisite for executing the one or more system calls and/or one or more additional capabilities to the be assigned to the process to fulfill the capabilities prerequisite for executing the one or more system calls. In the instances where the process has been assigned one or more capabilities not included in the capabilities prerequisite for executing the system calls, the capability analysis system may generate a recommendation that indicates one or more privilege levels that have the capabilities prerequisite for executing the one or more processes and fewer additional capabilities than the privilege level determined in 404 in some embodiments. Further, the capability analysis system may generate a recommendation that indicates one or more capabilities that can be unassigned from the process while still having the capabilities prerequisite for executing the one or more system calls.

In 416, the capability analysis system may generate a report based upon the analysis results generated in 412 and any recommendations generated in 414. The report may include one or more of the features of the report 136 (FIG. 1) and/or the report 240 (FIG. 2). The report may indicate the analysis results generated in 412 and/or the recommendations generated in 414.

In 418, the capability analysis system may cause the report to be displayed. For example, the capability analysis system may cause the report generated in 416 to be displayed on the computer system and/or the capability analysis system. In some embodiments, the capability analysis system may cause the report to be produced on a physical element (such as being printed by a printer).

The procedure 400 is illustrated with certain elements presented in a certain order. It should be understood that the elements of the procedure 400 may be performed in a different order and/or one or more of the elements may be performed concurrently in other embodiments. Further, one or more of the elements of the procedure 400 may be omitted and/or the procedure 400 may be part of a larger procedure that includes additional elements in some embodiments.

Figure 5:
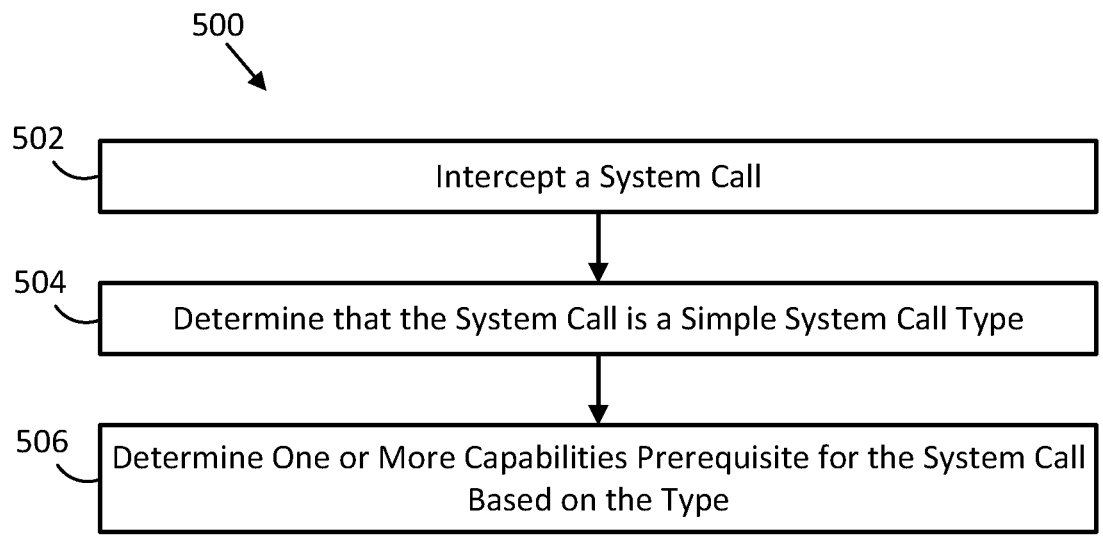
FIG. 5 illustrates an example procedure for a simple system call type in accordance with some embodiments.

FIG. 5 illustrates an example procedure 500 for a simple system call type in accordance with some embodiments. For example, the procedure 500 may be performed based on an intercepted system call being a simple system call type. The procedure 500 may be performed by a capability analysis system (such as the capability analysis system 102 (FIG. 1) and/or the capability analysis system 202 (FIG. 2)) and/or or as part of a system call analysis (such the system call analysis described in FIG. 3, where the capabilities determination system 304 (FIG. 3) and/or the simple call mapper 312 (FIG. 3) may perform one or more of the operations of the procedure 500. For brevity, the procedure 500 is described herein as being performed by the capability analysis system, although it should be understood that the procedure 500 could be performed as part of the system call analysis in other embodiments.

In 502, the capability analysis system may intercept a system call. For example, the capability analysis system may intercept a system call being made by a container (such as the container 114 (FIG. 1) and/or the container 214 (FIG. 2)) and/or a process (such as the first process 112 (FIG. 1), the second process 116 (FIG. 1), the first process 212 (FIG. 2), the second process 216 (FIG. 2), and/or the process 302 (FIG. 3)). The system call may be made to an OS kernel (such as the OS kernel 108 (FIG. 1) and/or the OS kernel 208 (FIG. 2)) and/or an OS (such as the OS 318 (FIG. 3)). The capability analysis system may intercept the system call during transit to the OS kernel and/or OS.

In 504, the capability analysis system may determine that the system call is a simple system call type. In particular, the capability analysis system may determine that the system call is a simple system call type in accordance with any of the approaches described herein for determining that a system call is a simple system call type. For example, the capability analysis system may receive an indication (such as a list) of system calls that are of the simple system call type. The capability analysis system may determine that the particular system call is a simple system call type based on the indication (such as being included in the list).

In 506, the capability analysis system may determine one or more capabilities prerequisite for the system call based on the type. In particular, the capability analysis system may determine one or more capabilities prerequisite for the particular system call based on the particular system call being determined to be a simple system call type. The capability analysis system may perform any of the analysis for the simple system call type described throughout this disclosure to determine the one or more capabilities prerequisite for the system call. The capability analysis system may retrieve information corresponding to the particular system call that indicates the capabilities prerequisite for execution of the particular system call.

The procedure 500 is illustrated with certain elements presented in a certain order. It should be understood that the elements of the procedure 500 may be performed in a different order and/or one or more of the elements may be performed concurrently in other embodiments. Further, one or more of the elements of the procedure 500 may be omitted and/or the procedure 500 may be part of a larger procedure that includes additional elements in some embodiments.

Figure 6:
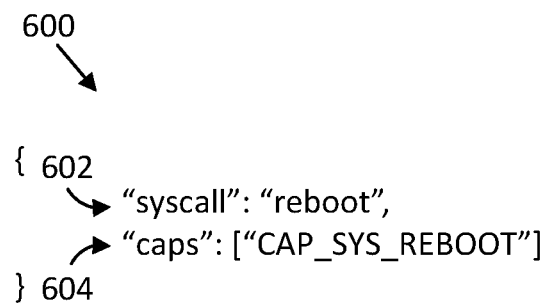
FIG. 6 illustrates an example system call mapping for a simple system call type in accordance with some embodiments.

FIG. 6 illustrates an example system call mapping 600 for a simple system call type in accordance with some embodiments. In particular, the system call mapping 600 may be a mapping for a reboot system call, where the reboot system call is a simple system call type. Determining the one or more capabilities in 506 (FIG. 5) of the procedure 500 (FIG. 5) may utilize a mapping, such as the system call mapping 600, to determine the capabilities prerequisite for execution of a system call of the simple system call type.

The system call mapping 600 may include an indication of the particular system call associated with the system call mapping 600. For example, the system call mapping 600 may include a system call indication 602 that indicates the particular system call for which the system call mapping 600 is to be utilized. In the illustrated embodiment, the system call indication 602 indicates "reboot," which indicates that the system call mapping 600 is to be utilized for reboot system calls. The system call mapping 600 may further include a capability indication 604 that indicates one or more capabilities prerequisite for execution of the corresponding system call. In the illustrated embodiment, the capability indication 604 indicates the capabilities prerequisite for execution of a reboot system call. In some embodiments, the value of the capability indication 604 may indicate a storage location that includes an indication of the capabilities prerequisite for execution of the system call. For example, the value of the capability indication 604 in the illustrated embodiment is shown as "CAP_SYS_REBOOT", which may correspond to a storage location that stores an indication of the capabilities prerequisite for execution of reboot system call.

FIG. 7 illustrates an example procedure 700 for an argument-specific call type in accordance with some embodiments. For example, the procedure 700 may be performed based on an intercepted system call being an argument-specific call type. The procedure 700 may be performed by a capability analysis system (such as the capability analysis system 102 (FIG. 1) and/or the capability analysis system 202 (FIG. 2)) and/or or as part of a system call analysis (such the system call analysis described in FIG. 3, where the capabilities determination system 304 (FIG. 3) and/or the simple call mapper 312 (FIG. 3) may perform one or more of the operations of the procedure 700. For brevity, the procedure 700 is described herein as being performed by the capability analysis system, although it should be understood that the procedure 700 could be performed as part of the system call analysis in other embodiments.

In 702, the capability analysis system may intercept a system call. For example, the capability analysis system may intercept a system call being made by a container (such as the container 114 (FIG. 1) and/or the container 214 (FIG. 2)) and/or a process (such as the first process 112 (FIG. 1), the second process 116 (FIG. 1), the first process 212 (FIG. 2), the second process 216 (FIG. 2), and/or the process 302 (FIG. 3)). The system call may be made to an OS kernel (such as the OS kernel 108 (FIG. 1) and/or the OS kernel 208 (FIG. 2)) and/or an OS (such as the OS 318 (FIG. 3)). The capability analysis system may intercept the system call during transit to the OS kernel and/or OS.

In 704, the capability analysis system may determine that the system call is an argument-specific call type. In particular, the capability analysis system may determine that the system call is an argument-specific call type in accordance with any of the approaches described herein for determining that a system call is an argument-specific call type. For example, the capability analysis system may receive an indication (such as a list) of system calls that are of the argument-specific call type. The capability analysis system may determine that the particular system call is an argument-specific call type based on the indication (such as being included in the list). In some embodiments, the capability analysis system may determine that the particular system call is an argument-specific call type based at least in part on the particular system call including one or more arguments and/or one or more particular arguments.

In 706, the capability analysis system may determine arguments of the system call. For example, the capability analysis system may determine one or more arguments included in the computer code of the system call. The capability analysis system may further determine the values of the arguments of the system call. The capability analysis system may determine the arguments based on a determination that the particular system call is to include the one or more arguments based on a template or example of the system call that may be retrieved by the capability analysis system.

In 708, the capability analysis system may determine one or more capabilities prerequisite for the system call based on the type and the arguments. In particular, the capability analysis system may determine one or more capabilities prerequisite for the particular system call based on the particular system call being determined to be an argument-specific call type and the arguments of the particular system call. The capability analysis system may perform any of the analysis for the argument-specific system call type described throughout this disclosure to determine the one or more capabilities prerequisite for the system call. The capability analysis system may retrieve information corresponding to the particular system call that indicates the capabilities prerequisite for execution of the particular system call based on the values of the arguments of the system call.

The procedure 700 is illustrated with certain elements presented in a certain order. It should be understood that the elements of the procedure 700 may be performed in a different order and/or one or more of the elements may be performed concurrently in other embodiments. Further, one or more of the elements of the procedure 700 may be omitted and/or the procedure 700 may be part of a larger procedure that includes additional elements in some embodiments.

FIG. 8 illustrates an example system call mapping 800 for an argument-specific system call type in accordance with some embodiments. In particular, the system call mapping 800 may be for a bind system call, where the bind system call is an argument-specific system call type. Determining the one or more capabilities in 708 (FIG. 7) of the procedure 700 (FIG. 7) may utilize a mapping, such as the system call mapping 800, to determine the capabilities prerequisite for execution of a system call of the argument-specific system call type.

The system call mapping 800 may include an indication of the particular system call associated with the system call mapping 800. For example, the system call mapping 800 may include a system call indication 802 that indicates the particular system call for which system call mapping 800 is to be utilized. In the illustrated embodiment, the system call indication 802 indicates "bind," which indicates that the system call mapping 800 is to be utilized for bind system calls.

For the argument-specific system call type, the system call mapping 800 may include one or more argument indications that indicate arguments of the system call that may affect the capabilities prerequisite for execution of the system call. In the illustrated embodiment, the system call mapping 800 includes a first argument indication 804. The first argument indication 804 may indicate a first argument of a bind system call that may affect the capabilities prerequisite for execution of the bind system call. In the illustrated embodiment, the first argument indication 804 indicates a "sockaddr.sin_family" argument of the bind system call can affect the capabilities prerequisite for execution of the system call. The first argument indication 804 may include an operator 806 and a value 808 for the argument, where the operator 806 may indicate a relationship with the value 808 that can affect the capabilities prerequisite for execution of the system call. In the illustrated embodiment, the operator 806 is indicated as being "EQUAL" and the value 808 is indicated as being "AF_INET". Accordingly, the first argument indication 804 may indicate that the sockaddr.sin_family argument having a value equal to AF_INET can affect the capabilities prerequisite for execution of the bind system call.

The system call mapping 800 further includes a second argument indication 810. The second argument indication 810 may indicate a second argument of a bind system call that may affect the capabilities prerequisite for execution of the bind system call. In the illustrated embodiment, the second argument indication 810 indicates a "socaddr.sin_port" argument of the bind system call can affect the capabilities prerequisite for execution of the system call. The second argument indication 810 may include an operator 812 and a value 814 for the argument, where the operator 812 may indicate a relationship with the value 808 that can affect the capabilities prerequisite for execution of the system call. The second argument indication 810 may further include a decision variable 816, where the second argument indication 810 may cause the decision variable 816 to be set and the capabilities prerequisite for execution of the system call may depend on the decision variable 816. In the illustrated embodiment, the operator 812 is indicated as being "LESS_THAN" and the value 814 is indicated as being 1024. The decision variable 816 is indicated as being true. Accordingly, the second argument indication 810 may set the decision variable 816 to a value of true if the value of socaddr.sin_port is less than 1024, otherwise the decision variable 816 may be set to or remain at a value of false.

The system call mapping 800 may include a capability indication 818 that indicates one or more capabilities prerequisite for execution of the corresponding system call. In the illustrated embodiment, the capability indication 818 indicates the capabilities prerequisite for execution of a bind system call. In some embodiments, the value of the capability indication 818 may indicate a storage location that includes an indication of the capabilities prerequisite for execution of the system call. For example, the value of the capability indication 818 in the illustrated embodiment is shown as "CAP_NET_BIND_SERVICE." The capabilities returned by the capability indication may be depended on the value of the decision variable 816. For example, the capabilities prerequisite for execution of the bind system call may include a first group of capabilities for the decision variable 816 having a value of false and may include a second group of capabilities for the decision variable 816 having a value of true.

Figure 9:
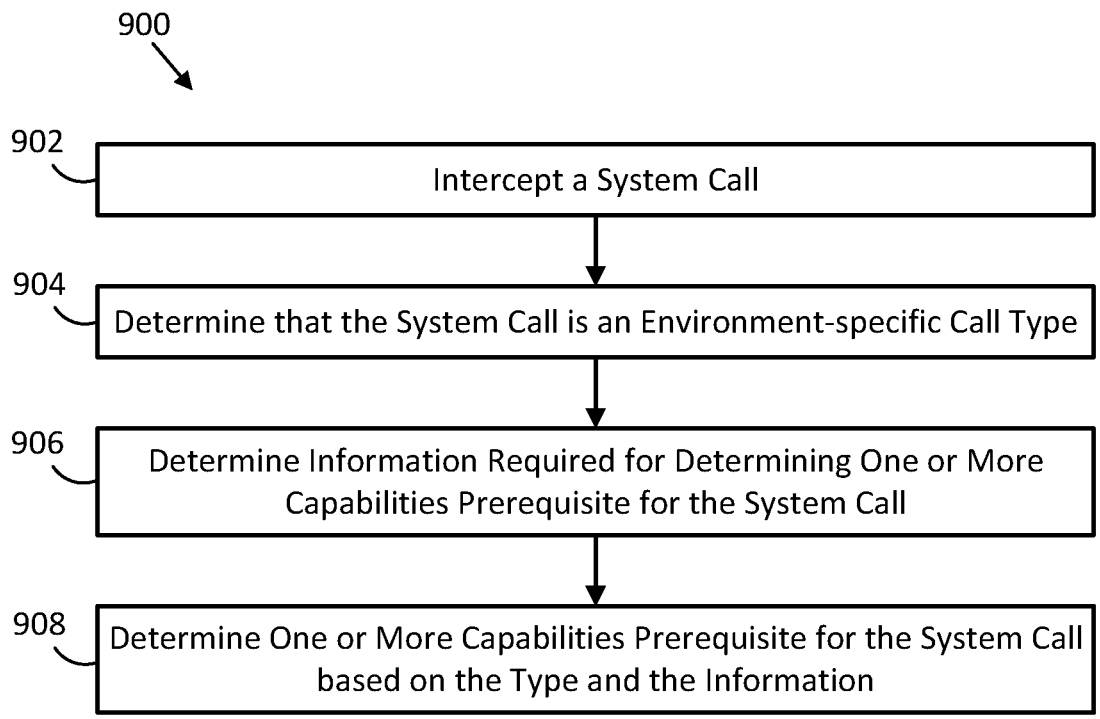
FIG. 9 illustrates an example procedure for an environment-specific call type in accordance with some embodiments.

FIG. 9 illustrates an example procedure 900 for an environment-specific call type in accordance with some embodiments. For example, the procedure 900 may be performed based on an intercepted system call being an environment-specific call type. The procedure 900 may be performed by a capability analysis system (such as the capability analysis system 102 (FIG. 1) and/or the capability analysis system 202 (FIG. 2)) and/or as part of a system call analysis (such the system call analysis described in FIG. 3, where the capabilities determination system 304 (FIG. 3) and/or the simple call mapper 312 (FIG. 3) may perform one or more of the operations of the procedure 900. For brevity, the procedure 900 is described herein as being performed by the capability analysis system, although it should be understood that the procedure 900 could be performed as part of the system call analysis in other embodiments.

In 902, the capability analysis system may intercept a system call. For example, the capability analysis system may intercept a system call being made by a container (such as the container 114 (FIG. 1) and/or the container 214 (FIG. 2)) and/or a process (such as the first process 112 (FIG. 1), the second process 116 (FIG. 1), the first process 212 (FIG. 2), the second process 216 (FIG. 2), and/or the process 302 (FIG. 3)). The system call may be made to an OS kernel (such as the OS kernel 108 (FIG. 1) and/or the OS kernel 208 (FIG. 2)) and/or an OS (such as the OS 318 (FIG. 3)). The capability analysis system may intercept the system call during transit to the OS kernel and/or OS.

In 904, the capability analysis system may determine that the system call is an environment-specific call type. In particular, the capability analysis system may determine that the system call is an environment-specific call type in accordance with any of the approaches described herein for determining that a system call is an environment-specific call type. For example, the capability analysis system may receive an indication (such as a list) of system calls that are of the environment-specific call type. The capability analysis system may determine that the particular system call is an environment-specific call type based on the indication (such as being included in the list).

In 906, the capability analysis system may determine information required for determining one or more capabilities prerequisite for the system call. The information may include one or more parameters for determining one or more capabilities prerequisite for the system call. In some embodiments, the parameters may include a set of call arguments of the system call. The parameters and/or set of call arguments may be related to an environment in which the system is to be executed. For example, the parameters and/or the set of call arguments may refer to one or more elements within the environment, where access to the one or more elements may depend on one or more settings of the environment. For example, the settings may require certain capabilities for access to the one or more elements. As an example, the system call may attempt to access data from a file where the file may require certain capabilities (such as a privilege level) to access the file. Determining information for determining the one or more capabilities may include retrieving capabilities for access to the one or more elements to be utilized by the system call.

In 908, the capability analysis system may determine one or more capabilities prerequisite for the system call based on the type and the information. For example, the capability analysis system may determine the capabilities prerequisite based on the system call being an environment-specific call type and the information determined in 906. The capabilities may include capabilities determined based on the particular system call, one or more arguments of the system call, information (such as settings) from the environment, or some combination thereof.

In some embodiments, determining the one or more capabilities may include determining whether the system call has been assigned adequate capabilities for execution of the system call within the system. The procedure 900 may output an indication of whether the system call has been assigned adequate capabilities for execution of the system call within the environment. In some of these embodiments, the capability analysis system may run a test to determine whether the system call can be executed within the environment with the current capabilities assigned to the system call. The test may be run in the environment, in a test environment (such as a sandbox) generated within the environment, and/or on a test system configured to replicate the environment. The capability analysis system may determine whether the system call can be executed within the environment based on the result of the test. For example, if the capability analysis system determines that the system call fails to execute properly in the test, the capability analysis system may determine that the system call has not been assigned adequate capabilities and may indicate that the system call requires one or more additional capabilities. The capability analysis system may determine the additional capabilities to be assigned to the system call for proper execution of the system call within the environment. The one or more additional capabilities indicated may be the additional capabilities determined based on the test. If the capability analysis system determines that the system call executes properly in the test, the capability analysis system may determine the system call has been assigned adequate capabilities and may indicate that the system has been assigned adequate capabilities.

The procedure 900 is illustrated with certain elements presented in a certain order. It should be understood that the elements of the procedure 900 may be performed in a different order and/or one or more of the elements may be performed concurrently in other embodiments. Further, one or more of the elements of the procedure 900 may be omitted and/or the procedure 900 may be part of a larger procedure that includes additional elements in some embodiments.

Figure 10:
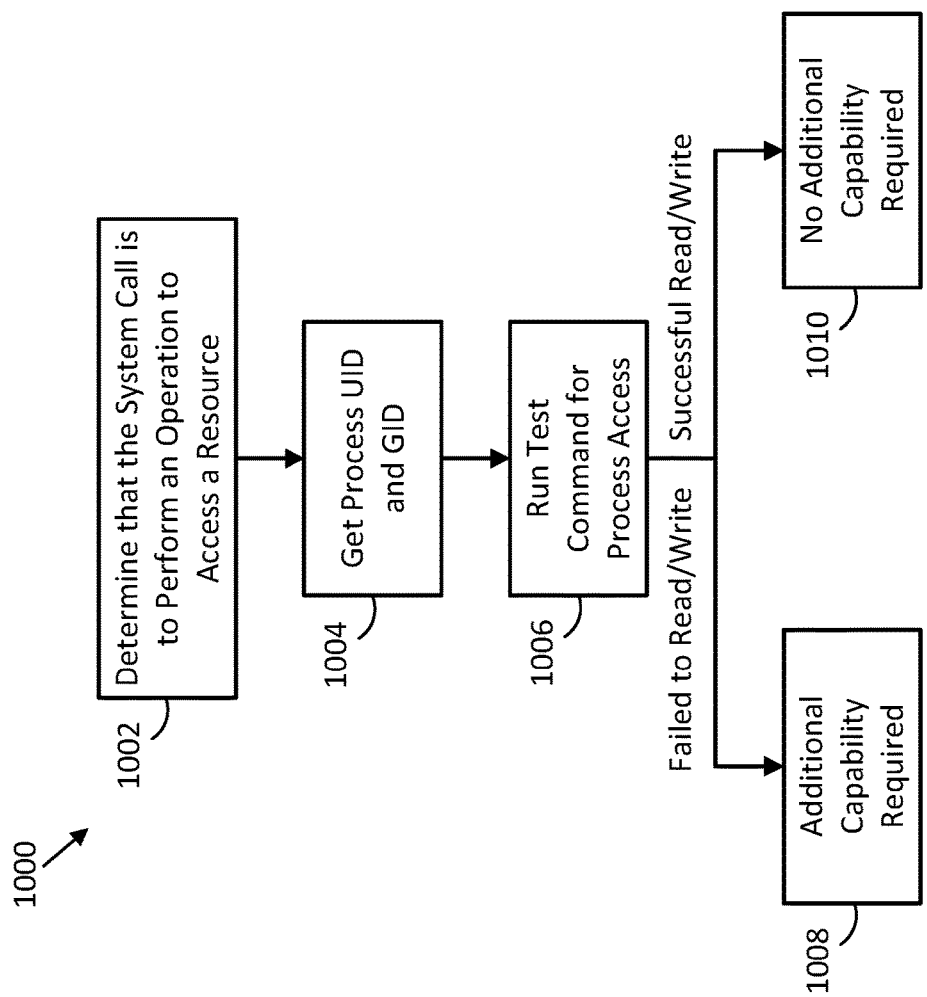
FIG. 10 illustrates an example procedure for determining whether an environment-specific system call has been assigned adequate capabilities for execution within an environment in accordance with some embodiments.

FIG. 10 illustrates an example procedure 1000 for determining whether an environment-specific system call has been assigned adequate capabilities for execution within an environment in accordance with some embodiments. The procedure 1000 may be executed as part of the procedure 900 (FIG. 9). For example, the procedure 1000, or portions thereof, may be performed as part of 906 (FIG. 9) and/or 908 (FIG. 9) of the procedure 900. The procedure 900 may be performed by a capability analysis system (such as the capability analysis system 102 (FIG. 1) and/or the capability analysis system 202 (FIG. 2)) and/or or as part of a system call analysis (such the system call analysis described in FIG. 3, where the capabilities determination system 304 (FIG. 3) and/or the simple call mapper 312 (FIG. 3) may perform one or more of the operations of the procedure 900. For brevity, the procedure 900 is described herein as being performed by the capability analysis system, although it should be understood that the procedure 900 could be performed as part of the system call analysis in other embodiments.

In 1002, the capability analysis system may determine that the system call is to perform an operation to access a resource. For example, the system call may be configured to perform an operation to access a resource (such as a file, a database, an operation, a processor, a memory, or another resource of an environment) of an environment (such as a computing system (including a server, a computer, and/or a computing device) and/or a program (such as an operating system) operating on a computing system). The capability analysis system may determine that the system call is configured to perform the operation to access the resource.

In 1004, the capability analysis system may get a process user identity (UID) and/or a process global identity (GID) related to the system call. For example, the capability analysis system determine a process identity (ID) corresponding to the operation to access the resource. The capability analysis system may utilize the process ID to obtain the UID and/or the GM. The UID and/or the GID may be obtained by the capability analysis system based on the process ID. Obtaining the UID and/or the GID may be part of determining and/or obtaining information for determining one or more capabilities prerequisite for execution of the system call. While the UID and/or the GID are obtained in the illustrated embodiment, it should be understood that other information that can be utilized for determining one or more capabilities prerequisite for execution of the system call, such as capabilities for access of the resource and/or a privilege level for accessing the resource.

In 1006, the capability analysis system may run one or more test commands for process access. For example, the capability analysis may run one or more test commands to attempt to execute the system call and/or to attempt to access the resource. The test commands may be executed in the environment, in a test environment (such as a sandbox) established within the environment, or within a test environment established separate from the environment with the test environment configured to replicate the environment. The test commands may be assigned the same capabilities assigned to the system call. Accordingly, the test commands may predict whether the system call would be able to access the resource.

Based on the test command, the capability analysis system may determine whether the system call can access the resource. In particular, the test commands may fail to read and/or write to the resource. Based on the test commands failing to read and/or write to the resource, the capability analysis system may determine that additional capability is required in 1008 for the system call to access the resource. In other instances, the test commands may successfully read and/or write to the resource. Based on the test command successfully reading and/or writing to the resource, the capability analysis system may determine that no additional capability is required in 1010 for the system call to access the resource.

The approaches described above may be implemented as part of an infrastructure as a service (IaaS). For example, the capability analysis systems (such as the capability analysis system 102 (FIG. 1) and/or the capability analysis system 202 (FIG. 2)) and/or the capabilities determination systems (such as the capabilities determination system 304 (FIG. 3)) may be implemented as part of an IaaS. Further, the procedures (such as the procedure 400 (FIG. 4), the procedure 500 (FIG. 5), the procedure 700 (FIG. 7), the procedure 900 (FIG. 9), and/or the procedure 1000 (FIG. 10)) described throughout this disclosure may be implemented by an IaaS.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like. In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 11:
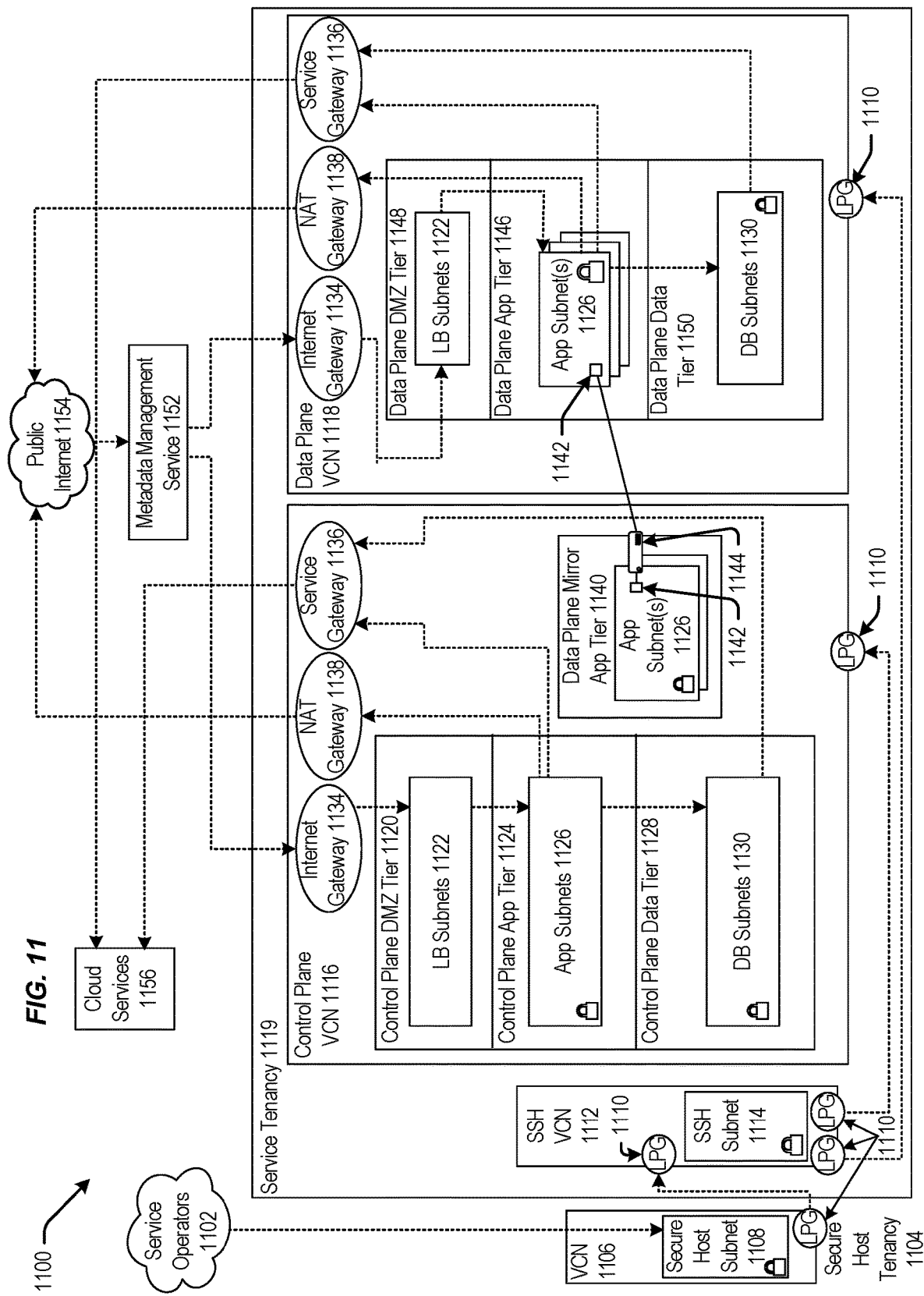
FIG. 11 is a block diagram illustrating one pattern for implementing a cloud infrastructure as a service system, according to at least one embodiment.

FIG. 11 is a block diagram 1100 illustrating an example pattern of an IaaS architecture, according to at least one embodiment. Service operators 1102 can be communicatively coupled to a secure host tenancy 1104 that can include a virtual cloud network (VCN) 1106 and a secure host subnet 1108. In some examples, the service operators 1102 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1106 and/or the Internet.

The VCN 1106 can include a local peering gateway (LPG) 1110 that can be communicatively coupled to a secure shell (SSH) VCN 1112 via an LPG 1110 contained in the SSH VCN 1112. The SSH VCN 1112 can include an SSH subnet 1114, and the SSH VCN 1112 can be communicatively coupled to a control plane VCN 1116 via the LPG 1110 contained in the control plane VCN 1116. Also, the SSH VCN 1112 can be communicatively coupled to a data plane VCN 1118 via an LPG 1110. The control plane VCN 1116 and the data plane VCN 1118 can be contained in a service tenancy 1119 that can be owned and/or operated by the IaaS provider.

The control plane VCN 1116 can include a control plane demilitarized zone (DMZ) tier 1120 that acts as a perimeter network (e.g., portions of a corporate network between the corporate intranet and external networks). The DMZ-based servers may have restricted responsibilities and help keep breaches contained. Additionally, the DMZ tier 1120 can include one or more load balancer (LB) subnet(s) 1122, a control plane app tier 1124 that can include app subnet(s) 1126, a control plane data tier 1128 that can include database (DB) subnet(s) 1130 (e.g., frontend DB subnet(s) and/or backend DB subnet(s)). The LB subnet(s) 1122 contained in the control plane DMZ tier 1120 can be communicatively coupled to the app subnet(s) 1126 contained in the control plane app tier 1124 and an Internet gateway 1134 that can be contained in the control plane VCN 1116, and the app subnet(s) 1126 can be communicatively coupled to the DB subnet(s) 1130 contained in the control plane data tier 1128 and a service gateway 1136 and a network address translation (NAT) gateway 1138. The control plane VCN 1116 can include the service gateway 1136 and the NAT gateway 1138.

The control plane VCN 1116 can include a data plane mirror app tier 1140 that can include app subnet(s) 1126. The app subnet(s) 1126 contained in the data plane mirror app tier 1140 can include a virtual network interface controller (VNIC) 1142 that can execute a compute instance 1144. The compute instance 1144 can communicatively couple the app subnet(s) 1126 of the data plane mirror app tier 1140 to app subnet(s) 1126 that can be contained in a data plane app tier 1146.

The data plane VCN 1118 can include the data plane app tier 1146, a data plane DMZ tier 1148, and a data plane data tier 1150. The data plane DMZ tier 1148 can include LB subnet(s) 1122 that can be communicatively coupled to the app subnet(s) 1126 of the data plane app tier 1146 and the Internet gateway 1134 of the data plane VCN 1118. The app subnet(s) 1126 can be communicatively coupled to the service gateway 1136 of the data plane VCN 1118 and the NAT gateway 1138 of the data plane VCN 1118. The data plane data tier 1150 can also include the DB subnet(s) 1130 that can be communicatively coupled to the app subnet(s) 1126 of the data plane app tier 1146.

The Internet gateway 1134 of the control plane VCN 1116 and of the data plane VCN 1118 can be communicatively coupled to a metadata management service 1152 that can be communicatively coupled to public Internet 1154. Public Internet 1154 can be communicatively coupled to the NAT gateway 1138 of the control plane VCN 1116 and of the data plane VCN 1118. The service gateway 1136 of the control plane VCN 1116 and of the data plane VCN 1118 can be communicatively couple to cloud services 1156.

In some examples, the service gateway 1136 of the control plane VCN 1116 or of the data plane VCN 1118 can make application programming interface (API) calls to cloud services 1156 without going through public Internet 1154. The API calls to cloud services 1156 from the service gateway 1136 can be one-way: the service gateway 1136 can make API calls to cloud services 1156, and cloud services 1156 can send requested data to the service gateway 1136. But, cloud services 1156 may not initiate API calls to the service gateway 1136.

In some examples, the secure host tenancy 1104 can be directly connected to the service tenancy 1119, which may be otherwise isolated. The secure host subnet 1108 can communicate with the SSH subnet 1114 through an LPG 1110 that may enable two-way communication over an otherwise isolated system. Connecting the secure host subnet 1108 to the SSH subnet 1114 may give the secure host subnet 1108 access to other entities within the service tenancy 1119.

The control plane VCN 1116 may allow users of the service tenancy 1119 to set up or otherwise provision desired resources. Desired resources provisioned in the control plane VCN 1116 may be deployed or otherwise used in the data plane VCN 1118. In some examples, the control plane VCN 1116 can be isolated from the data plane VCN 1118, and the data plane mirror app tier 1140 of the control plane VCN 1116 can communicate with the data plane app tier 1146 of the data plane VCN 1118 via VNICs 1142 that can be contained in the data plane mirror app tier 1140 and the data plane app tier 1146.

In some examples, users of the system, or customers, can make requests, for example create, read, update, or delete (CRUD) operations, through public Internet 1154 that can communicate the requests to the metadata management service 1152. The metadata management service 1152 can communicate the request to the control plane VCN 1116 through the Internet gateway 1134. The request can be received by the LB subnet(s) 1122 contained in the control plane DMZ tier 1120. The LB subnet(s) 1122 may determine that the request is valid, and in response to this determination, the LB subnet(s) 1122 can transmit the request to app subnet(s) 1126 contained in the control plane app tier 1124. If the request is validated and requires a call to public Internet 1154, the call to public Internet 1154 may be transmitted to the NAT gateway 1138 that can make the call to public Internet 1154. Metadata that may be desired to be stored by the request can be stored in the DB subnet(s) 1130.

In some examples, the data plane mirror app tier 1140 can facilitate direct communication between the control plane VCN 1116 and the data plane VCN 1118. For example, changes, updates, or other suitable modifications to configuration may be desired to be applied to the resources contained in the data plane VCN 1118. Via a VNIC 1142, the control plane VCN 1116 can directly communicate with, and can thereby execute the changes, updates, or other suitable modifications to configuration to, resources contained in the data plane VCN 1118.

In some embodiments, the control plane VCN 1116 and the data plane VCN 1118 can be contained in the service tenancy 1119. In this case, the user, or the customer, of the system may not own or operate either the control plane VCN 1116 or the data plane VCN 1118. Instead, the IaaS provider may own or operate the control plane VCN 1116 and the data plane VCN 1118, both of which may be contained in the service tenancy 1119. This embodiment can enable isolation of networks that may prevent users or customers from interacting with other users', or other customers', resources. Also, this embodiment may allow users or customers of the system to store databases privately without needing to rely on public Internet 1154, which may not have a desired level of threat prevention, for storage.

In other embodiments, the LB subnet(s) 1122 contained in the control plane VCN 1116 can be configured to receive a signal from the service gateway 1136. In this embodiment, the control plane VCN 1116 and the data plane VCN 1118 may be configured to be called by a customer of the IaaS provider without calling public Internet 1154. Customers of the IaaS provider may desire this embodiment since database(s) that the customers use may be controlled by the IaaS provider and may be stored on the service tenancy 1119, which may be isolated from public Internet 1154.

Figure 12:
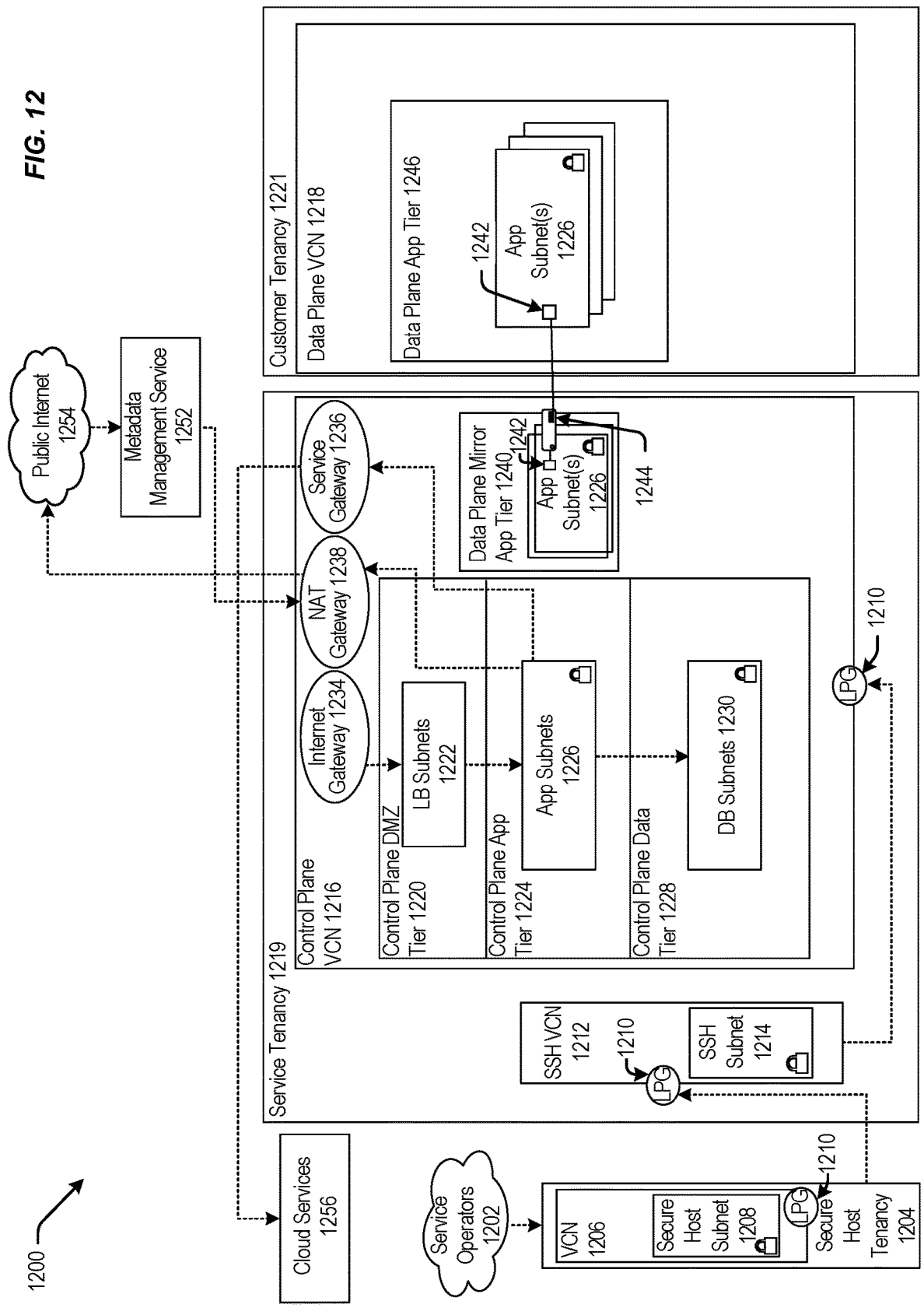
FIG. 12 is a block diagram illustrating another pattern for implementing a cloud infrastructure as a service system, according to at least one embodiment.

FIG. 12 is a block diagram 1200 illustrating another example pattern of an IaaS architecture, according to at least one embodiment. Service operators 1202 (e.g., service operators 1102 of FIG. 11) can be communicatively coupled to a secure host tenancy 1204 (e.g., the secure host tenancy 1104 of FIG. 11) that can include a virtual cloud network (VCN) 1206 (e.g., the VCN 1106 of FIG. 11) and a secure host subnet 1208 (e.g., the secure host subnet 1108 of FIG. 11). The VCN 1206 can include a local peering gateway (LPG) 1210 (e.g., the LPG 1110 of FIG. 11) that can be communicatively coupled to a secure shell (SSH) VCN 1212 (e.g., the SSH VCN 1112 of FIG. 11) via an LPG 1110 contained in the SSH VCN 1212. The SSH VCN 1212 can include an SSH subnet 1214 (e.g., the SSH subnet 1114 of FIG. 11), and the SSH VCN 1212 can be communicatively coupled to a control plane VCN 1216 (e.g., the control plane VCN 1116 of FIG. 11) via an LPG 1210 contained in the control plane VCN 1216. The control plane VCN 1216 can be contained in a service tenancy 1219 (e.g., the service tenancy 1119 of FIG. 11), and the data plane VCN 1218 (e.g., the data plane VCN 1118 of FIG. 11) can be contained in a customer tenancy 1221 that may be owned or operated by users, or customers, of the system.

The control plane VCN 1216 can include a control plane DMZ tier 1220 (e.g., the control plane DMZ tier 1120 of FIG. 11) that can include LB subnet(s) 1222 (e.g., LB subnet(s) 1122 of FIG. 11), a control plane app tier 1224 (e.g., the control plane app tier 1124 of FIG. 11) that can include app subnet(s) 1226 (e.g., app subnet(s) 1126 of FIG. 11), a control plane data tier 1228 (e.g., the control plane data tier 1128 of FIG. 11) that can include database (DB) subnet(s) 1230 (e.g., similar to DB subnet(s) 1130 of FIG. 11). The LB subnet(s) 1222 contained in the control plane DMZ tier 1220 can be communicatively coupled to the app subnet(s) 1226 contained in the control plane app tier 1224 and an Internet gateway 1234 (e.g., the Internet gateway 1134 of FIG. 11) that can be contained in the control plane VCN 1216, and the app subnet(s) 1226 can be communicatively coupled to the DB subnet(s) 1230 contained in the control plane data tier 1228 and a service gateway 1236

(e.g., the service gateway 1136 of FIG. 11) and a network address translation (NAT) gateway 1238 (e.g., the NAT gateway 1138 of FIG. 11). The control plane VCN 1216 can include the service gateway 1236 and the NAT gateway 1238.

The control plane VCN 1216 can include a data plane mirror app tier 1240 (e.g., the data plane mirror app tier 1140 of FIG. 11) that can include app subnet(s) 1226. The app subnet(s) 1226 contained in the data plane mirror app tier 1240 can include a virtual network interface controller (VNIC) 1242 (e.g., the VNIC of 1142) that can execute a compute instance 1244 (e.g., similar to the compute instance 1144 of FIG. 11). The compute instance 1244 can facilitate communication between the app subnet(s) 1226 of the data plane mirror app tier 1240 and the app subnet(s) 1226 that can be contained in a data plane app tier 1246 (e.g., the data plane app tier 1146 of FIG. 11) via the VNIC 1242 contained in the data plane mirror app tier 1240 and the VNIC 1242 contained in the data plane app tier 1246.

The Internet gateway 1234 contained in the control plane VCN 1216 can be communicatively coupled to a metadata management service 1252 (e.g., the metadata management service 1152 of FIG. 11) that can be communicatively coupled to public Internet 1254 (e.g., public Internet 1154 of FIG. 11). Public Internet 1254 can be communicatively coupled to the NAT gateway 1238 contained in the control plane VCN 1216. The service gateway 1236 contained in the control plane VCN 1216 can be communicatively couple to cloud services 1256 (e.g., cloud services 1156 of FIG. 11).

In some examples, the data plane VCN 1218 can be contained in the customer tenancy 1221. In this case, the IaaS provider may provide the control plane VCN 1216 for each customer, and the IaaS provider may, for each customer, set up a unique compute instance 1244 that is contained in the service tenancy 1219. Each compute instance 1244 may allow communication between the control plane VCN 1216, contained in the service tenancy 1219, and the data plane VCN 1218 that is contained in the customer tenancy 1221. The compute instance 1244 may allow resources, that are provisioned in the control plane VCN 1216 that is contained in the service tenancy 1219, to be deployed or otherwise used in the data plane VCN 1218 that is contained in the customer tenancy 1221.

In other examples, the customer of the IaaS provider may have databases that live in the customer tenancy 1221. In this example, the control plane VCN 1216 can include the data plane mirror app tier 1240 that can include app subnet(s) 1226. The data plane mirror app tier 1240 can reside in the data plane VCN 1218, but the data plane mirror app tier 1240 may not live in the data plane VCN 1218. That is, the data plane mirror app tier 1240 may have access to the customer tenancy 1221, but the data plane mirror app tier 1240 may not exist in the data plane VCN 1218 or be owned or operated by the customer of the IaaS provider. The data plane mirror app tier 1240 may be configured to make calls to the data plane VCN 1218 but may not be configured to make calls to any entity contained in the control plane VCN 1216. The customer may desire to deploy or otherwise use resources in the data plane VCN 1218 that are provisioned in the control plane VCN 1216, and the data plane mirror app tier 1240 can facilitate the desired deployment, or other usage of resources, of the customer.

In some embodiments, the customer of the IaaS provider can apply filters to the data plane VCN 1218. In this embodiment, the customer can determine what the data plane VCN 1218 can access, and the customer may restrict access to public Internet 1254 from the data plane VCN 1218. The IaaS provider may not be able to apply filters or otherwise control access of the data plane VCN 1218 to any outside networks or databases. Applying filters and controls by the customer onto the data plane VCN 1218, contained in the customer tenancy 1221, can help isolate the data plane VCN 1218 from other customers and from public Internet 1254.

In some embodiments, cloud services 1256 can be called by the service gateway 1236 to access services that may not exist on public Internet 1254, on the control plane VCN 1216, or on the data plane VCN 1218. The connection between cloud services 1256 and the control plane VCN 1216 or the data plane VCN 1218 may not be live or continuous. Cloud services 1256 may exist on a different network owned or operated by the IaaS provider. Cloud services 1256 may be configured to receive calls from the service gateway 1236 and may be configured to not receive calls from public Internet 1254. Some cloud services 1256 may be isolated from other cloud services 1256, and the control plane VCN 1216 may be isolated from cloud services 1256 that may not be in the same region as the control plane VCN 1216. For example, the control plane VCN 1216 may be located in "Region 1," and cloud service "Deployment 11," may be located in Region 1 and in "Region 2." If a call to Deployment 11 is made by the service gateway 1236 contained in the control plane VCN 1216 located in Region 1, the call may be transmitted to Deployment 11 in Region 1. In this example, the control plane VCN 1216, or Deployment 11 in Region 1, may not be communicatively coupled to, or otherwise in communication with, Deployment 11 in Region 2.

Figure 13:
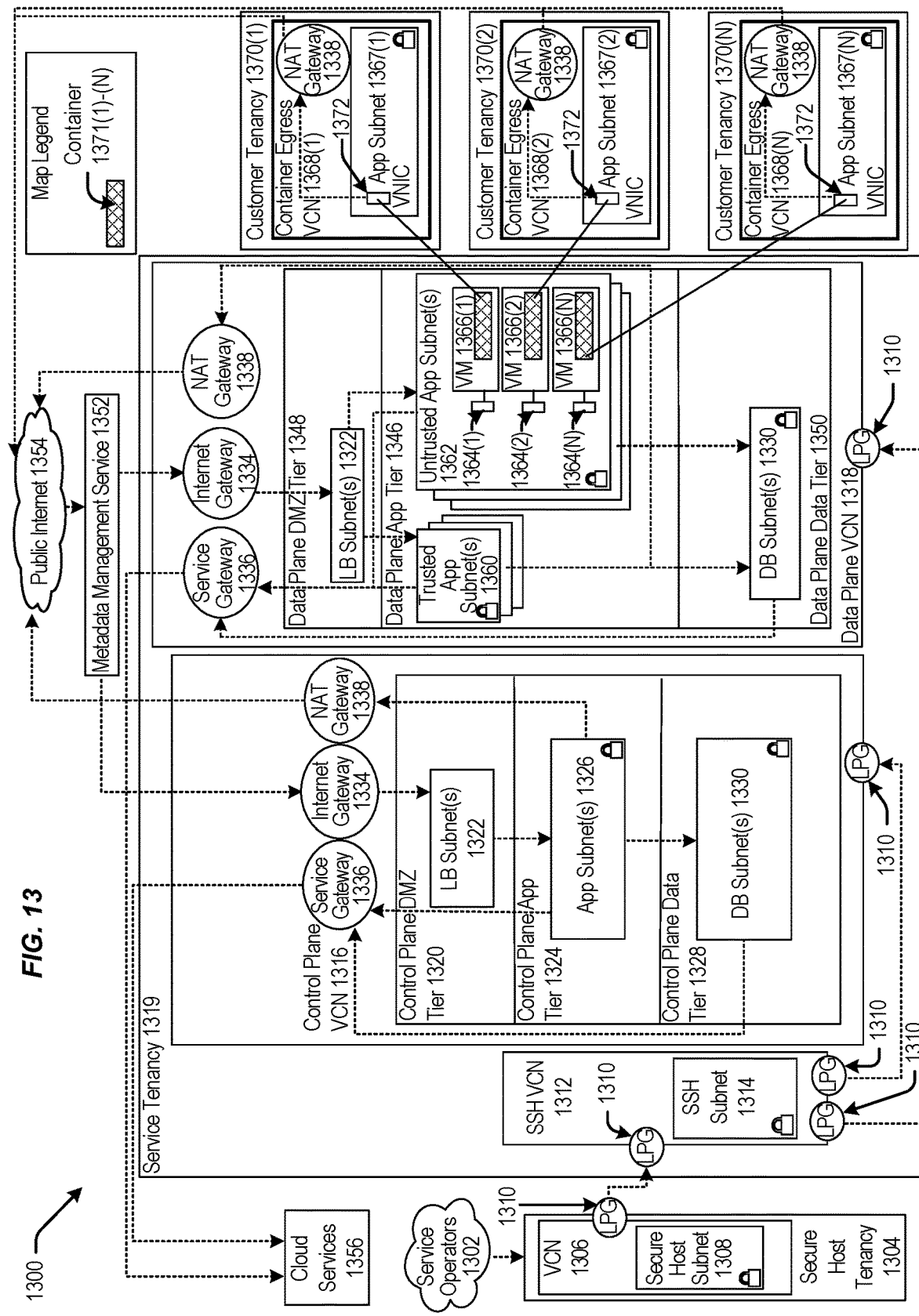
FIG. 13 is a block diagram illustrating another pattern for implementing a cloud infrastructure as a service system, according to at least one embodiment.

FIG. 13 is a block diagram 1300 illustrating another example pattern of an IaaS architecture, according to at least one embodiment. Service operators 1302 (e.g., service operators 1102 of FIG. 11) can be communicatively coupled to a secure host tenancy 1304 (e.g., the secure host tenancy 1104 of FIG. 11) that can include a virtual cloud network (VCN) 1306 (e.g., the VCN 1106 of FIG. 11) and a secure host subnet 1308 (e.g., the secure host subnet 1108 of FIG. 11). The VCN 1306 can include an LPG 1310 (e.g., the LPG 1110 of FIG. 11) that can be communicatively coupled to an SSH VCN 1312 (e.g., the SSH VCN 1112 of FIG. 11) via an LPG 1310 contained in the SSH VCN 1312. The SSH VCN 1312 can include an SSH subnet 1314 (e.g., the SSH subnet 1114 of FIG. 11), and the SSH VCN 1312 can be communicatively coupled to a control plane VCN 1316 (e.g., the control plane VCN 1116 of FIG. 11) via an LPG 1310 contained in the control plane VCN 1316 and to a data plane VCN 1318 (e.g., the data plane 1118 of FIG. 11) via an LPG 1310 contained in the data plane VCN 1318. The control plane VCN 1316 and the data plane VCN 1318 can be contained in a service tenancy 1319 (e.g., the service tenancy 1119 of FIG. 11).

The control plane VCN 1316 can include a control plane DMZ tier 1320 (e.g., the control plane DMZ tier 1120 of FIG. 11) that can include load balancer (LB) subnet(s) 1322 (e.g., LB subnet(s) 1122 of FIG. 11), a control plane app tier 1324 (e.g., the control plane app tier 1124 of FIG. 11) that can include app subnet(s) 1326 (e.g., similar to app subnet(s) 1126 of FIG. 11), a control plane data tier 1328 (e.g., the control plane data tier 1128 of FIG. 11) that can include DB subnet(s) 1330. The LB subnet(s) 1322 contained in the control plane DMZ tier 1320 can be communicatively coupled to the app subnet(s) 1326 contained in the control plane app tier 1324 and to an Internet gateway 1334 (e.g., the Internet gateway 1134 of FIG. 11) that can be contained in the control plane VCN 1316, and the app subnet(s) 1326 can be communicatively coupled to the DB subnet(s) 1330 contained in the control plane data tier 1328 and to a service gateway 1336 (e.g., the service gateway of FIG. 11) and a network address translation (NAT) gateway 1338 (e.g., the NAT gateway 1138 of FIG. 11). The control plane VCN 1316 can include the service gateway 1336 and the NAT gateway 1338.

The data plane VCN 1318 can include a data plane app tier 1346 (e.g., the data plane app tier 1146 of FIG. 11), a data plane DMZ tier 1348 (e.g., the data plane DMZ tier 1148 of FIG. 11), and a data plane data tier 1350 (e.g., the data plane data tier 1150 of FIG. 11). The data plane DMZ tier 1348 can include LB subnet(s) 1322 that can be communicatively coupled to trusted app subnet(s) 1360 and untrusted app subnet(s) 1362 of the data plane app tier 1346 and the Internet gateway 1334 contained in the data plane VCN 1318. The trusted app subnet(s) 1360 can be communicatively coupled to the service gateway 1336 contained in the data plane VCN 1318, the NAT gateway 1338 contained in the data plane VCN 1318, and DB subnet(s) 1330 contained in the data plane data tier 1350. The untrusted app subnet(s) 1362 can be communicatively coupled to the service gateway 1336 contained in the data plane VCN 1318 and DB subnet(s) 1330 contained in the data plane data tier 1350. The data plane data tier 1350 can include DB subnet(s) 1330 that can be communicatively coupled to the service gateway 1336 contained in the data plane VCN 1318.

The untrusted app subnet(s) 1362 can include one or more primary VNICs 1364(1)-(N) that can be communicatively coupled to tenant virtual machines (VMs) 1366(1)-(N). Each tenant VM 1366(1)-(N) can be communicatively coupled to a respective app subnet 1367(1)-(N) that can be contained in respective container egress VCNs 1368(1)-(N) that can be contained in respective customer tenancies 1370(1)-(N). Respective secondary VNICs 1372(1)-(N) can facilitate communication between the untrusted app subnet(s) 1362 contained in the data plane VCN 1318 and the app subnet contained in the container egress VCNs 1368(1)-(N). Each container egress VCNs 1368(1)-(N) can include a NAT gateway 1338 that can be communicatively coupled to public Internet 1354 (e.g., public Internet 1154 of FIG. 11).

The Internet gateway 1334 contained in the control plane VCN 1316 and contained in the data plane VCN 1318 can be communicatively coupled to a metadata management service 1352 (e.g., the metadata management system 1152 of FIG. 11) that can be communicatively coupled to public Internet 1354. Public Internet 1354 can be communicatively coupled to the NAT gateway 1338 contained in the control plane VCN 1316 and contained in the data plane VCN 1318. The service gateway 1336 contained in the control plane VCN 1316 and contained in the data plane VCN 1318 can be communicatively couple to cloud services 1356.

In some embodiments, the data plane VCN 1318 can be integrated with customer tenancies 1370. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1346. Code to run the function may be executed in the VMs 1366(1)-(N), and the code may not be configured to run anywhere else on the data plane VCN 1318. Each VM 1366(1)-(N) may be connected to one customer tenancy 1370. Respective containers 1371(1)-(N) contained in the VMs 1366(1)-(N) may be configured to run the code. In this case, there can be a dual isolation (e.g., the containers 1371(1)-(N) running code, where the containers 1371(1)-(N) may be contained in at least the VM 1366(1)-(N) that are contained in the untrusted app subnet(s) 1362, which may help prevent incorrect or otherwise undesirable code from damaging the network of the IaaS provider or from damaging a network of a different customer. The containers 1371(1)-(N) may be communicatively coupled to the customer tenancy 1370 and may be configured to transmit or receive data from the customer tenancy 1370. The containers 1371(1)-(N) may not be configured to transmit or receive data from any other entity in the data plane VCN 1318. Upon completion of running the code, the IaaS provider may kill or otherwise dispose of the containers 1371(1)-(N).

In some embodiments, the trusted app subnet(s) 1360 may run code that may be owned or operated by the IaaS provider. In this embodiment, the trusted app subnet(s) 1360 may be communicatively coupled to the DB subnet(s) 1330 and be configured to execute CRUD operations in the DB subnet(s) 1330. The untrusted app subnet(s) 1362 may be communicatively coupled to the DB subnet(s) 1330, but in this embodiment, the untrusted app subnet(s) may be configured to execute read operations in the DB subnet(s) 1330. The containers 1371(1)-(N) that can be contained in the VM 1366(1)-(N) of each customer and that may run code from the customer may not be communicatively coupled with the DB subnet(s) 1330.

In other embodiments, the control plane VCN 1316 and the data plane VCN 1318 may not be directly communicatively coupled. In this embodiment, there may be no direct communication between the control plane VCN 1316 and the data plane VCN 1318. However, communication can occur indirectly through at least one method. An LPG 1310 may be established by the IaaS provider that can facilitate communication between the control plane VCN 1316 and the data plane VCN 1318. In another example, the control plane VCN 1316 or the data plane VCN 1318 can make a call to cloud services 1356 via the service gateway 1336. For example, a call to cloud services 1356 from the control plane VCN 1316 can include a request for a service that can communicate with the data plane VCN 1318.

Figure 14:
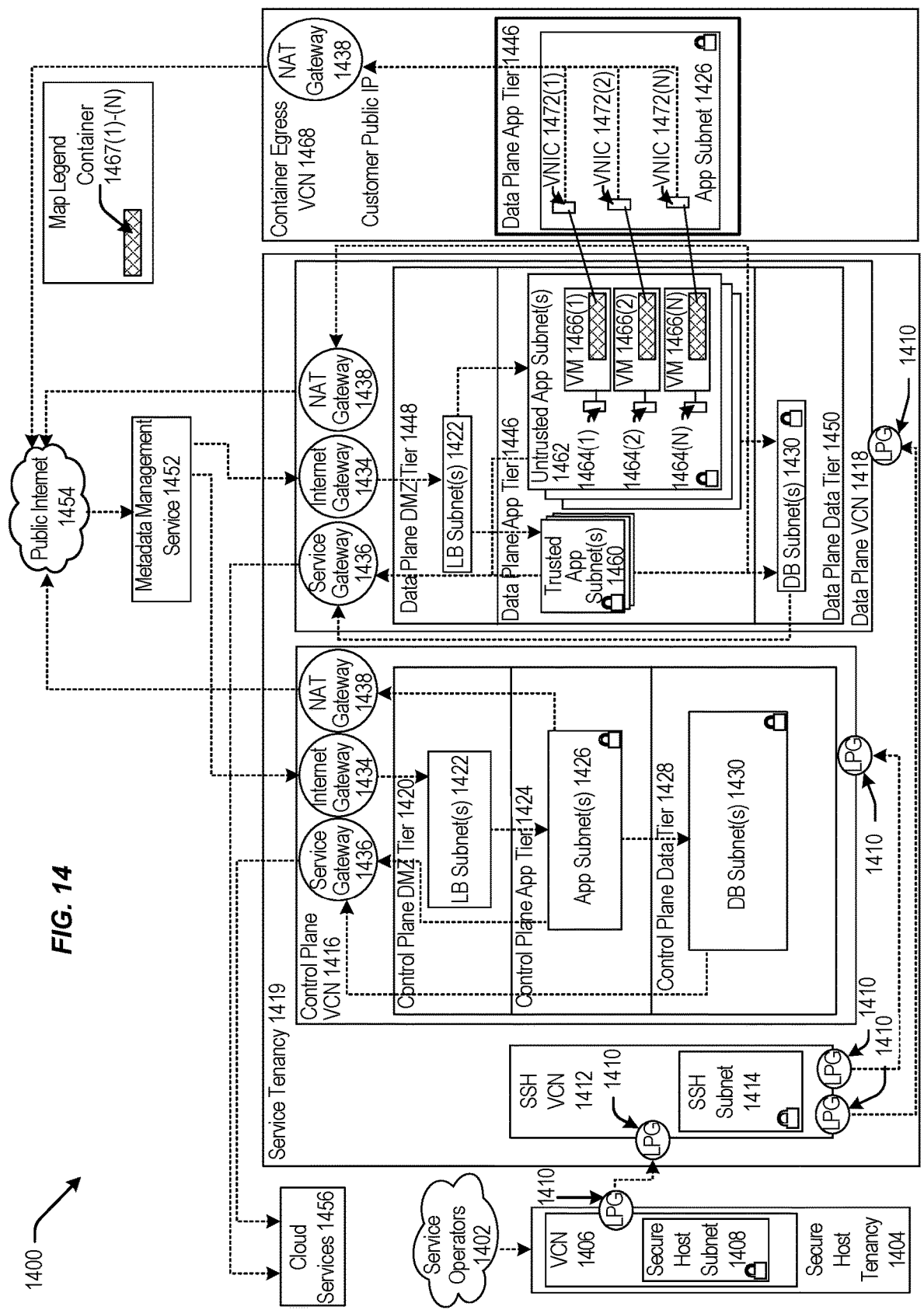
FIG. 14 is a block diagram illustrating another pattern for implementing a cloud infrastructure as a service system, according to at least one embodiment.
Figure 15:
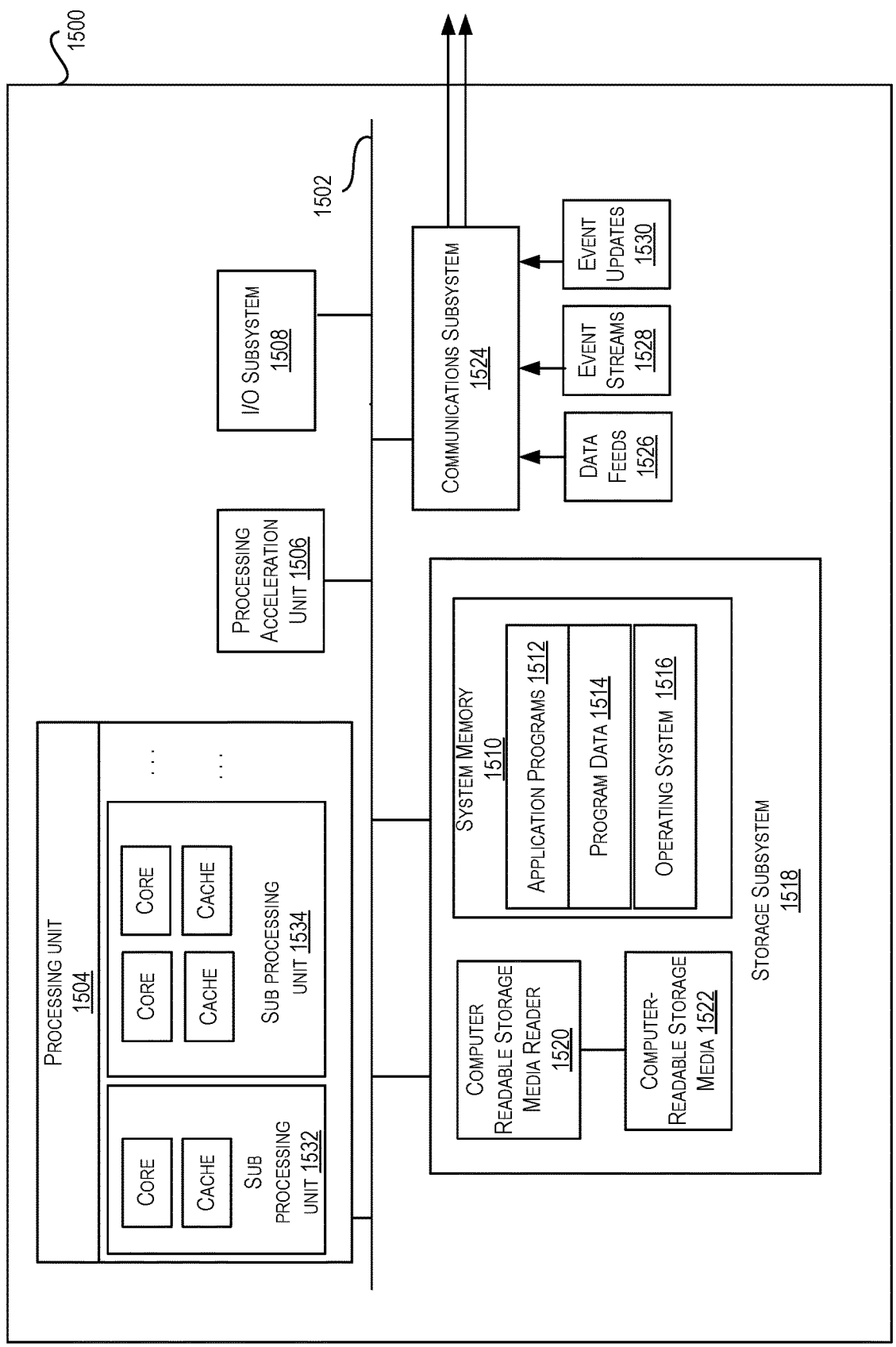
FIG. 15 is a block diagram illustrating an example computer system, according to at least one embodiment.

FIG. 14 is a block diagram 1400 illustrating another example pattern of an IaaS architecture, according to at least one embodiment. Service operators 1402 (e.g., service operators 1102 of FIG. 11) can be communicatively coupled to a secure host tenancy 1404 (e.g., the secure host tenancy 1104 of FIG. 11) that can include a virtual cloud network (VCN) 1406 (e.g., the VCN 1106 of FIG. 11) and a secure host subnet 1408 (e.g., the secure host subnet 1108 of FIG. 11). The VCN 1406 can include an LPG 1410 (e.g., the LPG 1110 of FIG. 11) that can be communicatively coupled to an SSH VCN 1412 (e.g., the SSH VCN 1112 of FIG. 11) via an LPG 1410 contained in the SSH VCN 1412. The SSH VCN 1412 can include an SSH subnet 1414 (e.g., the SSH subnet 1114 of FIG. 11), and the SSH VCN 1412 can be communicatively coupled to a control plane VCN 1416 (e.g., the control plane VCN 1116 of FIG. 11) via an LPG 1410 contained in the control plane VCN 1416 and to a data plane VCN 1418 (e.g., the data plane 1118 of FIG. 11) via an LPG 1410 contained in the data plane VCN 1418. The control plane VCN 1416 and the data plane VCN 1418 can be contained in a service tenancy 1419 (e.g., the service tenancy 1119 of FIG. 11).

The control plane VCN 1416 can include a control plane DMZ tier 1420 (e.g., the control plane DMZ tier 1120 of FIG. 11) that can include LB subnet(s) 1422 (e.g., LB subnet(s) 1122 of FIG. 11), a control plane app tier 1424 (e.g., the control plane app tier 1124 of FIG. 11) that can include app subnet(s) 1426 (e.g., app subnet(s) 1126 of FIG. 11), a control plane data tier 1428 (e.g., the control plane data tier 1128 of FIG. 11) that can include DB subnet(s) 1430 (e.g., DB subnet(s) 1330 of FIG. 13). The LB subnet(s) 1422 contained in the control plane DMZ tier 1420 can be communicatively coupled to the app subnet(s) 1426 contained in the control plane app tier 1424 and to an Internet gateway 1434 (e.g., the Internet gateway 1134 of FIG. 11) that can be contained in the control plane VCN 1416, and the app subnet(s) 1426 can be communicatively coupled to the DB subnet(s) 1430 contained in the control plane data tier 1428 and to a service gateway 1436 (e.g., the service gateway of FIG. 11) and a network address translation (NAT) gateway 1438 (e.g., the NAT gateway 1138 of FIG. 11). The control plane VCN 1416 can include the service gateway 1436 and the NAT gateway 1438.

The data plane VCN 1418 can include a data plane app tier 1446 (e.g., the data plane app tier 1146 of FIG. 11), a data plane DMZ tier 1448 (e.g., the data plane DMZ tier 1148 of FIG. 11), and a data plane data tier 1450 (e.g., the data plane data tier 1150 of FIG. 11). The data plane DMZ tier 1448 can include LB subnet(s) 1422 that can be communicatively coupled to trusted app subnet(s) 1460 (e.g., trusted app subnet(s) 1360 of FIG. 13) and untrusted app subnet(s) 1462 (e.g., untrusted app subnet(s) 1362 of FIG. 13) of the data plane app tier 1446 and the Internet gateway 1434 contained in the data plane VCN 1418. The trusted app subnet(s) 1460 can be communicatively coupled to the service gateway 1436 contained in the data plane VCN 1418, the NAT gateway 1438 contained in the data plane VCN 1418, and DB subnet(s) 1430 contained in the data plane data tier 1450. The untrusted app subnet(s) 1462 can be communicatively coupled to the service gateway 1436 contained in the data plane VCN 1418 and DB subnet(s) 1430 contained in the data plane data tier 1450. The data plane data tier 1450 can include DB subnet(s) 1430 that can be communicatively coupled to the service gateway 1436 contained in the data plane VCN 1418.

The untrusted app subnet(s) 1462 can include primary VNICs 1464(1)-(N) that can be communicatively coupled to tenant virtual machines (VMs) 1466(1)-(N) residing within the untrusted app subnet(s) 1462. Each tenant VM 1466(1)-(N) can run code in a respective container 1467(1)-(N), and be communicatively coupled to an app subnet 1426 that can be contained in a data plane app tier 1446 that can be contained in a container egress VCN 1468. Respective secondary VNICs 1472(1)-(N) can facilitate communication between the untrusted app subnet(s) 1462 contained in the data plane VCN 1418 and the app subnet contained in the container egress VCN 1468. The container egress VCN can include a NAT gateway 1438 that can be communicatively coupled to public Internet 1454 (e.g., public Internet 1154 of FIG. 11).

The Internet gateway 1434 contained in the control plane VCN 1416 and contained in the data plane VCN 1418 can be communicatively coupled to a metadata management service 1452 (e.g., the metadata management system 1152 of FIG. 11) that can be communicatively coupled to public Internet 1454. Public Internet 1454 can be communicatively coupled to the NAT gateway 1438 contained in the control plane VCN 1416 and contained in the data plane VCN 1418. The service gateway 1436 contained in the control plane VCN 1416 and contained in the data plane VCN 1418 can be communicatively couple to cloud services 1456.

In some examples, the pattern illustrated by the architecture of block diagram 1400 of FIG. 14 may be considered an exception to the pattern illustrated by the architecture of block diagram 1300 of FIG. 13 and may be desirable for a customer of the IaaS provider if the IaaS provider cannot directly communicate with the customer (e.g., a disconnected region). The respective containers 1467(1)-(N) that are contained in the VMs 1466(1)-(N) for each customer can be accessed in real-time by the customer. The containers 1467(1)-(N) may be configured to make calls to respective secondary VNICs 1472(1)-(N) contained in app subnet(s) 1426 of the data plane app tier 1446 that can be contained in the container egress VCN 1468. The secondary VNICs 1472(1)-(N) can transmit the calls to the NAT gateway 1438 that may transmit the calls to public Internet 1454. In this example, the containers 1467(1)-(N) that can be accessed in real-time by the customer can be isolated from the control plane VCN 1416 and can be isolated from other entities contained in the data plane VCN 1418. The containers 1467(1)-(N) may also be isolated from resources from other customers.

In other examples, the customer can use the containers 1467(1)-(N) to call cloud services 1456. In this example, the customer may run code in the containers 1467(1)-(N) that requests a service from cloud services 1456. The containers 1467(1)-(N) can transmit this request to the secondary VNICs 1472(1)-(N) that can transmit the request to the NAT gateway that can transmit the request to public Internet 1454. Public Internet 1454 can transmit the request to LB subnet(s) 1422 contained in the control plane VCN 1416 via the Internet gateway 1434. In response to determining the request is valid, the LB subnet(s) can transmit the request to app subnet(s) 1426 that can transmit the request to cloud services 1456 via the service gateway 1436.

It should be appreciated that IaaS architectures 1100, 1200, 1300, 1400 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

FIG. 15 illustrates an example computer system 1500, in which various embodiments may be implemented. The system 1500 may be used to implement any of the computer systems described above. As shown in the figure, computer system 1500 includes a processing unit 1504 that communicates with a number of peripheral subsystems via a bus subsystem 1502. These peripheral subsystems may include a processing acceleration unit 1506, an I/O subsystem 1508, a storage subsystem 1518 and a communications subsystem 1524. Storage subsystem 1518 includes tangible computer-readable storage media 1522 and a system memory 1510.

Bus subsystem 1502 provides a mechanism for letting the various components and subsystems of computer system 1500 communicate with each other as intended. Although bus subsystem 1502 is shown schematically as a single bus, alternative embodiments of the bus subsystem may utilize multiple buses. Bus subsystem 1502 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1504, which can be implemented as one or more integrated circuits (e.g., a conventional microprocessor or microcontroller), controls the operation of computer system 1500. One or more processors may be included in processing unit 1504. These processors may include single core or multicore processors. In certain embodiments, processing unit 1504 may be implemented as one or more independent processing units 1532 and/or 1534 with single or multicore processors included in each processing unit. In other embodiments, processing unit 1504 may also be implemented as a quad-core processing unit formed by integrating two dual-core processors into a single chip.

In various embodiments, processing unit 1504 can execute a variety of programs in response to program code and can maintain multiple concurrently executing programs or processes. At any given time, some or all of the program code to be executed can be resident in processor(s) 1504 and/or in storage subsystem 1518. Through suitable programming, processor(s) 1504 can provide various functionalities described above. Computer system 1500 may additionally include a processing acceleration unit 1506, which can include a digital signal processor (DSP), a special-purpose processor, and/or the like.

I/O subsystem 1508 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1500 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1500 may comprise a storage subsystem 1518 that comprises software elements, shown as being currently located within a system memory 1510. System memory 1510 may store program instructions that are loadable and executable on processing unit 1504, as well as data generated during the execution of these programs.

Depending on the configuration and type of computer system 1500, system memory 1510 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1504. In some implementations, system memory 1510 may include multiple different types of memory, such as static random access memory (SRAM) or dynamic random access memory (DRAM). In some implementations, a basic input/output system (BIOS), containing the basic routines that help to transfer information between elements within computer system 1500, such as during start-up, may typically be stored in the ROM. By way of example, and not limitation, system memory 1510 also illustrates application programs 1512, which may include client applications, Web browsers, mid-tier applications, relational database management systems (RDBMS), etc., program data 1514, and an operating system 1516. By way of example, operating system 1516 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems.

Storage subsystem 1518 may also provide a tangible computer-readable storage medium for storing the basic programming and data constructs that provide the functionality of some embodiments. Software (programs, code modules, instructions) that when executed by a processor provide the functionality described above may be stored in storage subsystem 1518. These software modules or instructions may be executed by processing unit 1504. Storage subsystem 1518 may also provide a repository for storing data used in accordance with the present disclosure.

Storage subsystem 1500 may also include a computer-readable storage media reader 1520 that can further be connected to computer-readable storage media 1522. Together and, optionally, in combination with system memory 1510, computer-readable storage media 1522 may comprehensively represent remote, local, fixed, and/or removable storage devices plus storage media for temporarily and/or more permanently containing, storing, transmitting, and retrieving computer-readable information.

Computer-readable storage media 1522 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1500.

By way of example, computer-readable storage media 1522 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1522 may include, but is not limited to, Zip® drives, flash memory cards, universal serial bus (USB) flash drives, secure digital (SD) cards, DVD disks, digital video tape, and the like. Computer-readable storage media 1522 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1500.

Communications subsystem 1524 provides an interface to other computer systems and networks. Communications subsystem 1524 serves as an interface for receiving data from and transmitting data to other systems from computer system 1500. For example, communications subsystem 1524 may enable computer system 1500 to connect to one or more devices via the Internet. In some embodiments communications subsystem 1524 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1524 can provide wired network connectivity (e.g., Ethernet) in addition to or instead of a wireless interface.

In some embodiments, communications subsystem 1524 may also receive input communication in the form of structured and/or unstructured data feeds 1526, event streams 1528, event updates 1530, and the like on behalf of one or more users who may use computer system 1500.

By way of example, communications subsystem 1524 may be configured to receive data feeds 1526 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1524 may also be configured to receive data in the form of continuous data streams, which may include event streams 1528 of real-time events and/or event updates 1530, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1524 may also be configured to output the structured and/or unstructured data feeds 1526, event streams 1528, event updates 1530, and the like to one or more databases that may be in communication with one or more streaming data source computers coupled to computer system 1500.

Computer system 1500 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1500 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Examples

In the following sections, further exemplary embodiments are provided.

Example 1 may include one or more non-transitory, computer-readable media having instructions stored thereon, wherein the instructions, when executed by one or more processors, cause an analysis system to perform processing comprising intercepting a system call to be made by a process during execution of the process, where the system call is to be executed by a kernel of an operating system of a computer system that is to execute the process, determining one or more capabilities prerequisite for execution of the system call, determining a set of one or more capabilities associated with the process, and generating a report comprising information indicative of the one or more capabilities and the set of one or more capabilities.

Example 2 may include the one or more non-transitory, computer-readable media of example 1, wherein determining the one or more capabilities comprises determining a type of the system call, and determining the one or more capabilities prerequisite for execution of the system call by performing analysis based on the type of the system call.

Example 3 may include the one or more non-transitory, computer-readable media of example 2, wherein determining the type of the system call comprises determining that the system call is a simple system call type, and determining the one or more capabilities based on the type of the system call comprises determining the one or more capabilities based on the system call being the simple system call type.

Example 4 may include the one or more non-transitory, computer-readable media of example 2, wherein determining the type of the system call comprises determining that the system call is an argument-specific system call type, and determining the one or more capabilities comprises determining the one or more capabilities based on the system call being the argument-specific system call type.

Example 5 may include the one or more non-transitory, computer-readable media of example 4, wherein performing the analysis comprises determining one or more arguments of the system call, and determining the one or more capabilities based on the one or more arguments.

Example 6 may include the one or more non-transitory, computer-readable media of example 2, wherein determining the type of the system call comprises determining that the system call is an environment-specific system call type, and determining the one or more capabilities comprises determining the one or more capabilities based on the system call being the environment-specific system call type.

Example 7 may include the one or more non-transitory, computer-readable media of example 6, wherein performing the analysis comprises determining one or more parameters corresponding to the system call, determining a state of an environment in which the system call is to be executed, and determining the one or more capabilities based on the one or more parameters and the state of the environment.

Example 8 may include the one or more non-transitory, computer-readable media of example 1 wherein the one or more capabilities comprises a first capability, wherein the processing further comprises identifying a change to the system call such that the first capability is not prerequisite for execution of the system call, and wherein the report further comprises information indicative of the change to the system call in the report.

Example 9 may include the one or more non-transitory, computer-readable media of example 8, wherein the change to the system call includes changing an argument of the system call.

Example 10 may include the one or more non-transitory, computer-readable media of example 8, wherein the change to the system call includes changing a state of an environment in which the process is to be executed.

Example 11 may include the one or more non-transitory, computer-readable media of example 8, wherein the system call is a first system call, and wherein the change to the system call includes changing the first system call to a second system call.

Example 12 may include the one or more non-transitory, computer-readable media of example 1, wherein the processing further comprises determining a current privilege level associated with execution of the process, determining, based on the current privilege level, that the process does not have a capability of the one or more capabilities, and determining an updated privilege level that provides the process with all of the one or more capabilities prerequisite for execution of the system call based on the process not having the capability, wherein the report further comprises information indicative of the updated privilege level.

Example 13 may include the one or more non-transitory, computer-readable media of example 1, wherein the processing further comprises determining, based on a current privilege level, capabilities of the process, determining that the capabilities of the process includes a capability not included in the one or more capabilities prerequisite for execution of the system call, and determining an updated privilege level that provides the one or more capabilities prerequisite for execution of the system call without the capability, wherein the report further comprises information indicative of the updated privilege level.

Example 14 may include the one or more non-transitory, computer-readable media of example 1, wherein the processing further comprises determining a set of capabilities for performance of all system calls to be made by the process during the execution of the process, wherein the report further indicates the set of capabilities.

Example 15 may include the one or more non-transitory, computer-readable media of example 1, wherein the system call is intercepted prior to execution by the kernel of the operating system.

Example 16 may include the one or more non-transitory, computer-readable media of example 1, wherein the process is to be executed as part of a container.

Example 17 may include a method, comprising intercepting, by an analysis system, a system call to be made by a process during execution of the process, where the system call is to be executed by a kernel of an operating system of a computer system that is to execute the process, determining, by the analysis system, one or more capabilities prerequisite for execution of the system call, determining, by the analysis system, a set of one or more capabilities associated with the process, and generating, by the analysis system, a report comprising information indicative of the one or more capabilities and the set of one or more capabilities.

Example 18 may include the method of example 17, further comprising determining, by the analysis system, a type of the system call, and determining, by the analysis system, the one or more capabilities prerequisite for execution of the system call by performing analysis based on the type of the system call.

Example 19 may include an analysis system, comprising a memory to store a system call to be made by a process during execution of the process, and a processor to intercept the system call for storage in the memory, where the system call is to be executed by a kernel of an operating system of a computer system that is to execute the process, determine one or more capabilities prerequisite for execution of the system call, determine a set of one or more capabilities associated with the process, and generate a report comprising information indicative of the one or more capabilities and the set of one or more capabilities.

Example 20 may include the analysis system of example 19, wherein the processor is further to determine a type of the system call, and determine the one or more capabilities prerequisite for execution of the system call by performing analysis based on the type of the system call.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. One or more non-transitory, computer-readable media having instructions stored thereon, wherein the instructions, when executed by one or more processors, cause an analysis system to perform processing comprising:
   intercepting a system call to be made by a process during execution of the process, where the system call is to be executed by a kernel of an operating system of a computer system that is to execute the process;
   determining one or more capabilities prerequisite for execution of the system call;
   determining a set of one or more capabilities associated with the process;
   determining, based on a current privilege level of the process, capabilities of the process;
   determining that the capabilities of the process include a capability not included in the one or more capabilities prerequisite for execution of the system call;
   determining an updated privilege level that provides the one or more capabilities prerequisite for execution of the system call without the capability; and
   generating a report comprising information indicative of the one or more capabilities, the set of one or more capabilities, and information indicative of the updated privilege level.

2. The one or more non-transitory, computer-readable media of claim 1, wherein determining the one or more capabilities comprises:

determining a type of the system call; and determining the one or more capabilities prerequisite for execution of the system call by performing analysis based on the type of the system call.

3. The one or more non-transitory, computer-readable media of claim 2, wherein:

determining the type of the system call comprises determining that the system call is a simple system call type; and determining the one or more capabilities based on the type of the system call comprises determining the one or more capabilities based on the system call being the simple system call type.

4. The one or more non-transitory, computer-readable media of claim 2, wherein:

determining the type of the system call comprises determining that the system call is an argument-specific system call type; and determining the one or more capabilities comprises determining the one or more capabilities based on the system call being the argument-specific system call type.

5. The one or more non-transitory, computer-readable media of claim 4, wherein performing the analysis comprises:

determining one or more arguments of the system call; and determining the one or more capabilities based on the one or more arguments.

6. The one or more non-transitory, computer-readable media of claim 2, wherein:

determining the type of the system call comprises determining that the system call is an environment-specific system call type; and determining the one or more capabilities comprises determining the one or more capabilities based on the system call being the environment-specific system call type.

7. The one or more non-transitory, computer-readable media of claim 6, wherein performing the analysis comprises:

determining one or more parameters corresponding to the system call;

determining a state of an environment in which the system call is to be executed; and determining the one or more capabilities based on the one or more parameters and the state of the environment.

8. The one or more non-transitory, computer-readable media of claim 1:

wherein the one or more capabilities comprises a first capability;

wherein the processing further comprises identifying a change to the system call such that the first capability is not prerequisite for execution of the system call; and wherein the report further comprises information indicative of the change to the system call in the report.

9. The one or more non-transitory, computer-readable media of claim 8, wherein the change to the system call includes changing an argument of the system call.

10. The one or more non-transitory, computer-readable media of claim 8, wherein the change to the system call includes changing a state of an environment in which the process is to be executed.

11. The one or more non-transitory, computer-readable media of claim 8, wherein the system call is a first system call, and wherein the change to the system call includes changing the first system call to a second system call.

12. The one or more non-transitory, computer-readable media of claim 1, wherein the capability is a first capability, wherein the processing further comprises:

determining the current privilege level associated with execution of the process; and determining, based on the current privilege level, that the process does not have a second capability of the one or more capabilities, wherein the updated privilege level is further determined based on the updated privilege level providing the second capability.

13. The one or more non-transitory, computer-readable media of claim 1, wherein intercepting the system call includes preventing the system call from arriving at an execution engine of the kernel or delaying execution of the system call by the execution engine until determination whether the system call can be properly performed by the execution engine.

14. The one or more non-transitory, computer-readable media of claim 1, wherein the processing further comprises:

determining a set of capabilities for performance of all system calls to be made by the process during the execution of the process, wherein the report further indicates the set of capabilities.

15. The one or more non-transitory, computer-readable media of claim 1, wherein the system call is intercepted prior to execution by the kernel of the operating system.

16. The one or more non-transitory, computer-readable media of claim 1, wherein the process is to be executed as part of a container.

17. A method, comprising:

intercepting, by an analysis system, a system call to be made by a process during execution of the process, where the system call is to be executed by a kernel of an operating system of a computer system that is to execute the process;

determining, by the analysis system, one or more capabilities prerequisite for execution of the system call;

determining, by the analysis system, a set of one or more capabilities associated with the process;

determining, by the analysis system based on a current privilege level of the process, capabilities of the process;

determining, by the analysis system, that the capabilities of the process include a capability not included in the one or more capabilities prerequisite for execution of the system call;

determining, by the analysis system, an updated privilege level that provides the one or more capabilities prerequisite for execution of the system call without the capability; and generating, by the analysis system, a report comprising information indicative of the one or more capabilities and the set of one or more capabilities, and information indicative of the updated privilege level.

18. The method of claim 17, further comprising:

determining, by the analysis system, a type of the system call; and determining, by the analysis system, the one or more capabilities prerequisite for execution of the system call by performing analysis based on the type of the system call.

19. An analysis system, comprising:
a memory to store a system call to be made by a process during execution of the process; and
a processor to:
intercept the system call for storage in the memory, where the system call is to be executed by a kernel of an operating system of a computer system that is to execute the process;
determine one or more capabilities prerequisite for execution of the system call;
determine a set of one or more capabilities associated with the process;
determine, based on a current privilege level of the process, capabilities of the process;
determine that the capabilities of the process include a capability not included in the one or more capabilities prerequisite for execution of the system call;
determining an updated privilege level that provides the one or more capabilities prerequisite for execution of the system call without the capability; and
generate a report comprising information indicative of the one or more capabilities and the set of one or more capabilities, and information indicative of the updated privilege level.

20. The analysis system of claim 19, wherein the processor is further to:
determine a type of the system call; and
determine the one or more capabilities prerequisite for execution of the system call by performing analysis based on the type of the system call.

* * * * *